United States Patent
Morita

(10) Patent No.: US 7,363,448 B2
(45) Date of Patent: Apr. 22, 2008

(54) DATA STORAGE APPARATUS, DATA PROCESSING METHOD, RECORDING MEDIUM, AND PROGRAM

(75) Inventor: Tadashi Morita, Tokyo (JP)

(73) Assignee: Sony Corporation (JP)

(*) Notice: Subject to any disclaimer, the term of this patent is extended or adjusted under 35 U.S.C. 154(b) by 281 days.

(21) Appl. No.: 11/280,242

(22) Filed: Nov. 17, 2005

(65) Prior Publication Data

US 2006/0117190 A1 Jun. 1, 2006

(30) Foreign Application Priority Data

Nov. 29, 2004 (JP) ............................ P2004-344183

(51) Int. Cl.
*G06F 12/00* (2006.01)
(52) U.S. Cl. .................... 711/163; 711/100; 713/171; 713/182; 713/176; 713/183
(58) Field of Classification Search ................ 711/163, 711/164, 100; 713/171, 182, 176, 183, 184
See application file for complete search history.

(56) References Cited

U.S. PATENT DOCUMENTS

| | | | |
|---|---|---|---|
| 4,864,542 A * | 9/1989 | Oshima et al. | ......... 365/189.01 |
| 5,901,311 A | 5/1999 | Labatte et al. | |
| 6,292,392 B1 | 9/2001 | Fukui | |
| 2003/0112662 A1 | 6/2003 | Tanzawa et al. | |
| 2003/0142545 A1 | 7/2003 | Imamiya et al. | |

FOREIGN PATENT DOCUMENTS

| | | |
|---|---|---|
| EP | 1 249 712 | 10/2002 |
| JP | 60-205428 | 10/1985 |
| JP | 3-46882 | * 7/1989 |
| JP | 09-055084 | 2/1997 |
| JP | 09-326679 | 12/1997 |
| JP | 10-020780 | 1/1998 |
| JP | 2000-066760 | 3/2000 |
| JP | 2001-1796290 | 6/2001 |

OTHER PUBLICATIONS

European Search Report; Application No./Patent No. 05292524.5-2221; Dated: Jan. 17, 2007.

* cited by examiner

*Primary Examiner*—Kimberly McLean
(74) *Attorney, Agent, or Firm*—Rader Fishman & Grauer PLLC; Ronald P. Kananen

(57) ABSTRACT

A data storage apparatus includes a storage unit having a storage area. The data storage apparatus includes a read key registration unit registering a first read key that is transmitted from a first information processing apparatus and that permits reading data from the storage area; a write control unit controlling writing data in the storage unit so that writing new data in the storage area is prohibited until data stored in the storage area is read for the first time; and a read control unit controlling reading data from the storage unit so that reading data from the storage area is permitted if a second read key that is transmitted from the first information processing apparatus or a second information processing apparatus matches the first read key when reading data from the storage area is requested by the first information processing apparatus or the second information processing apparatus.

7 Claims, 16 Drawing Sheets

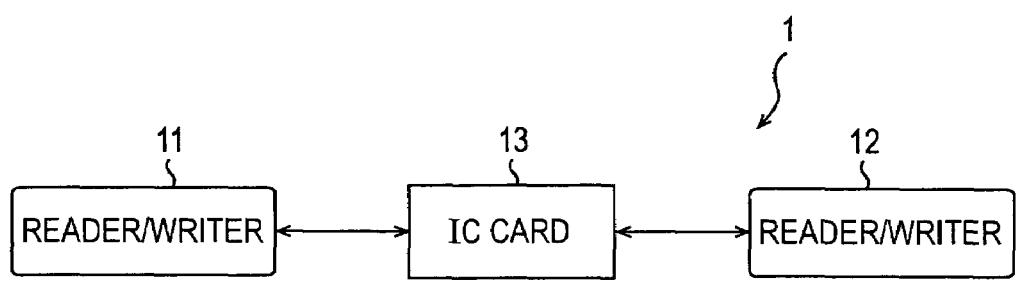

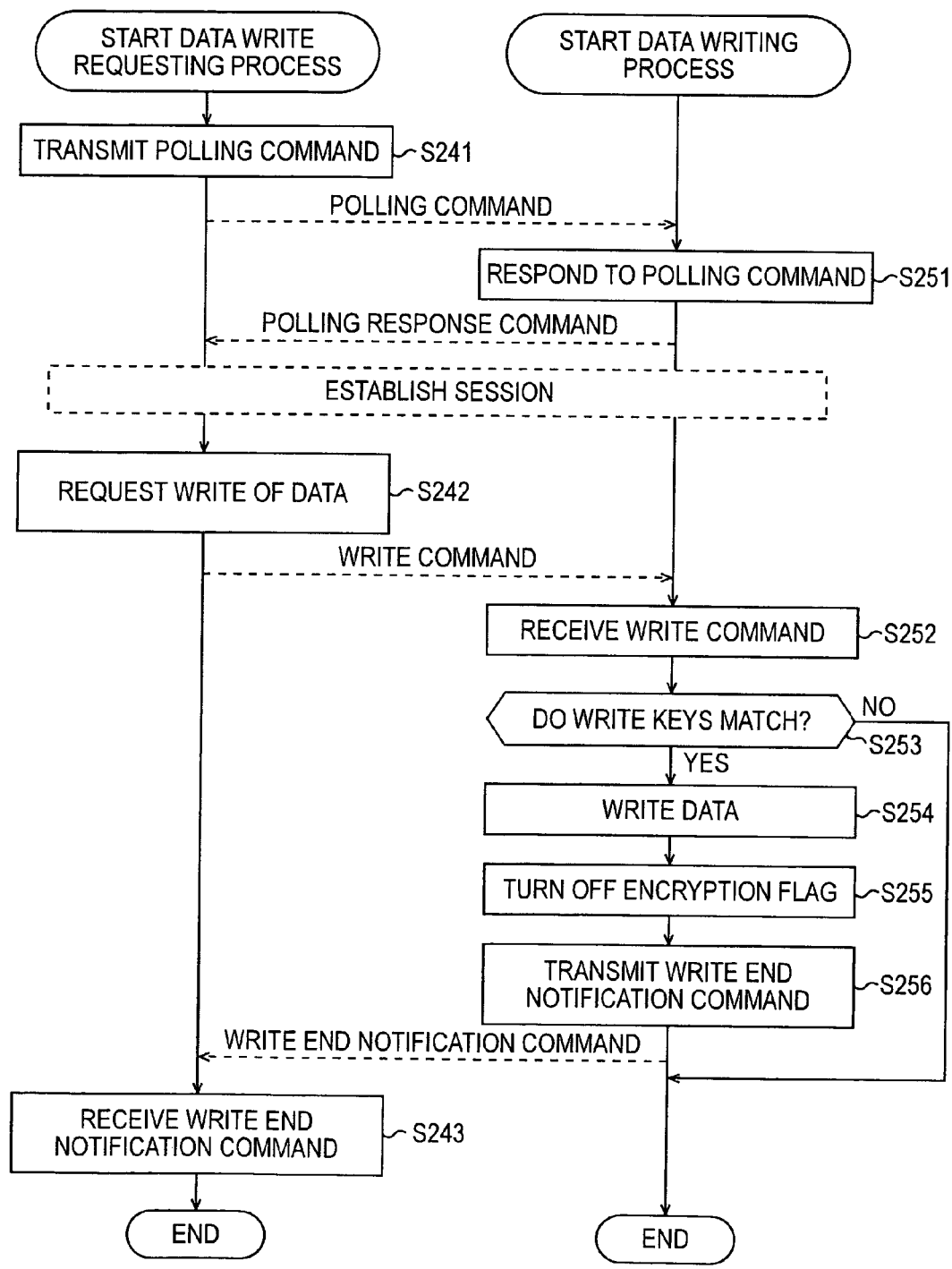

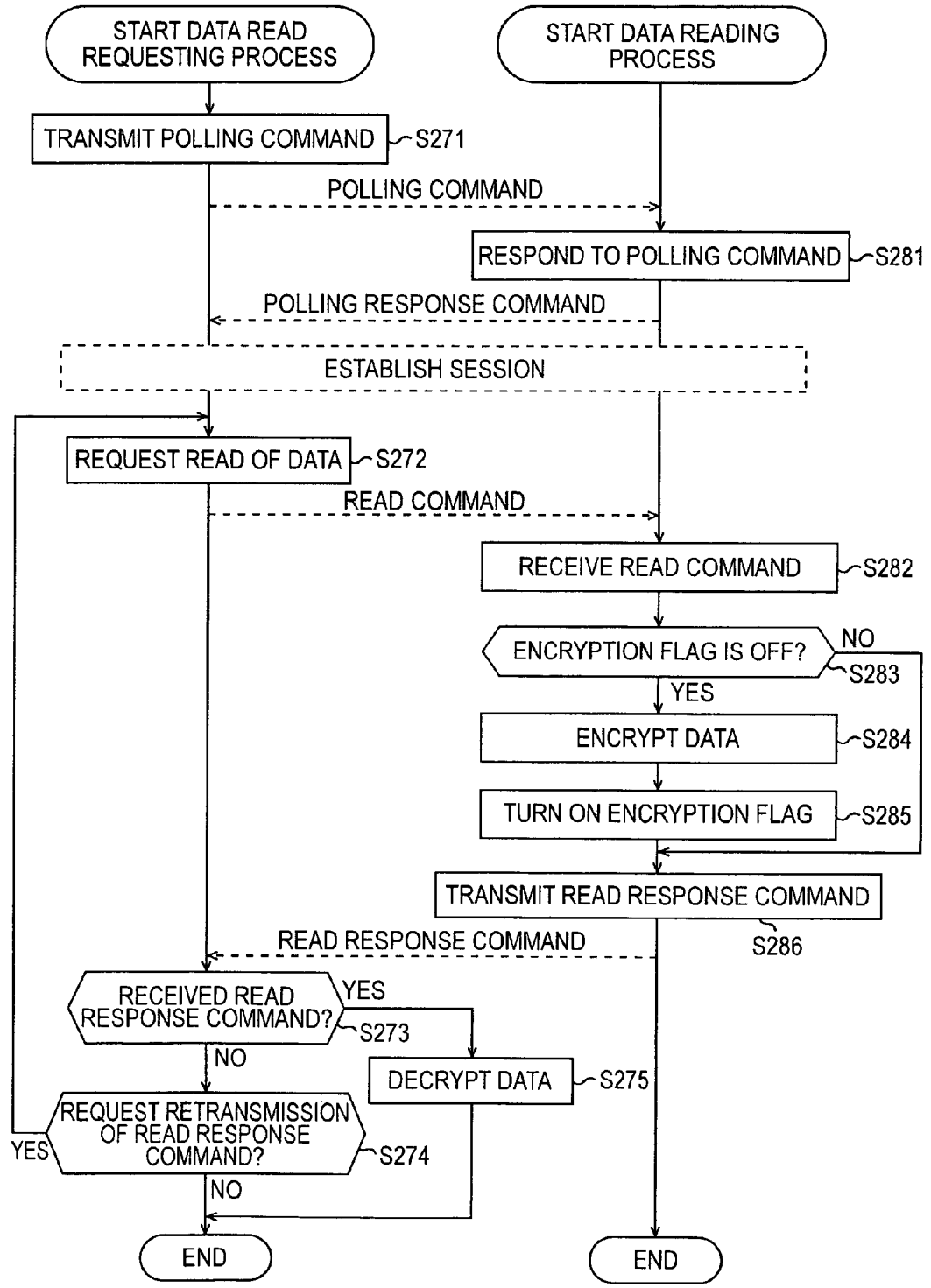

DATA STORAGE APPARATUS, DATA PROCESSING METHOD, RECORDING MEDIUM, AND PROGRAM

CROSS REFERENCES TO RELATED APPLICATIONS

The present invention contains subject matter related to Japanese Patent Application JP 2004-344183 filed in the Japanese Patent Office on Nov. 29, 2004, the entire contents of which are incorporated herein by reference.

BACKGROUND OF THE INVENTION

1. Field of the Invention

The present invention relates to a data storage apparatus, a data processing method, a recording medium, and a program in which security of data can be ensured.

2. Description of the Related Art

In recent years, a large amount of information is transmitted/received through a transmission line such as the Internet or various recording media in everyday life due to development of an information processing technology. In such transmission/reception of information, cryptography is used to ensure security.

Secret key cryptography is an example of the cryptography. In the secret key cryptography, a transmitter and a receiver have a common secret key. The transmitter transmits data encrypted by using the secret key and the receiver decrypts the encrypted data by using the secret key.

As an example of cryptography using a secret key method, a method for performing mutual authentication between a transmitter and a receiver by using two types of secret keys has been proposed (e.g., see Patent Document 1: Japanese Unexamined Patent Application Publication No. 10-20780).

On the other hand, public key cryptography, which replaces the secret key cryptography, has become common. In the public key cryptography, data is encrypted and decrypted by using a pair of keys. One of the two keys serves as a public key and is widely open to the public and the other serves as a secret key and is strictly managed by a person who released the public key. Data encrypted by the secret key can only be decrypted by using the public key as a counterpart, and data encrypted by the public key can only be decrypted by using the secret key as a counterpart. In this method, data encrypted by using the public key cannot be decrypted until a person who has the secret key obtains it, and thus the data can be securely transmitted. In the secret key cryptography, a secret key needs to be transmitted to a receiver of data through a safe line so that a third party cannot obtain the key. On the other hand, in the public key cryptography, the safety of a line to transmit a public key need not be strictly managed and thus its holder can easily manage the key without caring about theft of the key.

For example, a public key infrastructure (PKI) is known as a security infrastructure using public key cryptography.

SUMMARY OF THE INVENTION

However, in the secret key cryptography, a secret key needs to be transmitted through a safe route before transmission/reception of data. Further, data needs to be encrypted by using a secret key that varies depending on a receiver. Therefore, management of the key and a procedure of transmitting/receiving data become complicated disadvantageously.

In the public key cryptography, a receiver of data needs to release a public key and a transmitter of the data needs to obtain the public key before transmission/reception of data. Further, the transmitter needs to encrypt data by using a public key that varies depending on a receiver. Therefore, management of the key and a procedure of transmitting/receiving data become complicated disadvantageously.

Further, in the PKI, a certificate authority, which is an organization of a third party for issuing a certificate to certify a holder of a public key, needs to be provided. In this configuration, the scale of the system becomes large and a procedure of transmitting/receiving data becomes complicated disadvantageously.

The present invention has been made in view of the above-described circumstances and is directed to enable simpler and safer transmission/reception of data.

A data storage apparatus according to a first embodiment of the present invention is a data storage apparatus including a storage unit having a storage area. The data storage apparatus includes: a read key registration unit registering a first read key that is transmitted from a first information processing apparatus and that permits reading data from the storage area; a write control unit controlling writing data in the storage unit so that writing new data in the storage area is prohibited until data stored in the storage area is read for the first time; and a read control unit controlling reading data from the storage unit so that reading data from the storage area is permitted if a second read key that is transmitted from the first information processing apparatus or a second information processing apparatus matches the first read key when reading data from the storage area is requested by the first information processing apparatus or the second information processing apparatus.

The write control unit may control writing data in the storage unit so as to further write a digital signature in the storage area, the digital signature being generated by encrypting data to be written in the storage area and being transmitted together with the data to be written in the storage area. When checking the data stored in the storage area is requested without the second key being transmitted from the first information processing apparatus or the second information processing apparatus, the read control unit may control reading data from the storage unit so as to read the digital signature from the storage area and to transmit the digital signature to the first information processing apparatus or the second information processing apparatus.

A data processing method according to the first embodiment of the present invention is a data processing method for a data storage apparatus including a storage unit having a storage area. The data processing method includes the steps of: registering a first read key that is transmitted from a first information processing apparatus and that permits reading data from the storage area; controlling writing data in the storage unit so that writing new data in the storage area is prohibited until data stored in the storage area is read for the first time; and controlling reading data from the storage unit so that reading data from the storage area is permitted if a second read key that is transmitted from the first information processing apparatus or a second information processing apparatus matches the first read key when reading data from the storage area is requested by the first information processing apparatus or the second information processing apparatus.

A program recorded in a recording medium according to the first embodiment of the present invention is a program for data processing performed in a data storage apparatus including a storage unit having a storage area. The program includes the steps of: registering a first read key that is transmitted from a first information processing apparatus and that permits reading data from the storage area; controlling writing data in the storage unit so that writing new data in the storage area is prohibited until data stored in the storage area is read for the first time; and controlling reading data from the storage unit so that reading data from the storage area is permitted if a second read key that is transmitted from the first information processing apparatus or a second information processing apparatus matches the first read key when reading data from the storage area is requested by the first information processing apparatus or the second information processing apparatus.

A program according to the first embodiment of the present invention is a program allowing a data storage apparatus including a storage unit having a storage area to execute data processing. The program includes the steps of: registering a first read key that is transmitted from a first information processing apparatus and that permits reading data from the storage area; controlling writing data in the storage unit so that writing new data in the storage area is prohibited until data stored in the storage area is read for the first time; and controlling reading data from the storage unit so that reading data from the storage area is permitted if a second read key that is transmitted from the first information processing apparatus or a second information processing apparatus matches the first read key when reading data from the storage area is requested by the first information processing apparatus or the second information processing apparatus.

A data storage apparatus according to a second embodiment of the present invention is a data storage apparatus including a storage unit having a storage area. The data storage apparatus includes: a write key registration unit registering a first write key that is transmitted from a first information processing apparatus and that permits writing data in the storage area; a write control unit controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus; an encrypting unit encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and a transmission control unit transmitting the data encrypted by the encrypting unit to the first information processing apparatus or the second information processing apparatus when the data stored in the storage area is read for the first time in response to a request for reading the data from the storage area from the first information processing apparatus or the second information processing apparatus and reading the data encrypted by the encrypting unit from the storage area and transmitting the read data to the first information processing apparatus or the second information processing apparatus when the data stored in the storage area is read for the second time or thereafter.

A data processing method according to the second embodiment of the present invention is a data processing method for a data storage apparatus including a storage unit having a storage area. The data processing method includes the steps of: registering a first write key that is transmitted from a first information processing apparatus and that permits writing data in the storage area; controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus; encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter.

A program recorded in a recording medium according to the second embodiment of the present invention is a program for data processing performed in a data storage apparatus including a storage unit having a storage area. The program includes the steps of: registering a first write key that is transmitted from a first information processing apparatus and that permits writing data in the storage area; controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus; encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter.

A program according to the second embodiment of the present invention is a program allowing a data storage apparatus including a storage unit having a storage area to execute data processing. The program includes the steps of: registering a first write key that is transmitted from a first information processing apparatus and that permits writing data in the storage area; controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus; encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter.

According to the data storage apparatus, data processing method, recording medium, and program according to the first embodiment of the present invention, a first read key that is transmitted from a first information processing apparatus and that permits reading data from the storage area is registered, writing data in the storage unit is controlled so that writing new data in the storage area is prohibited until data stored in the storage area is read for the first time, and reading data from the storage unit is controlled so that reading data from the storage area is permitted if a second read key that is transmitted from the first information processing apparatus or a second information processing apparatus matches the first read key when reading data from the storage area is requested by the first information processing apparatus or the second information processing apparatus.

According to the data storage apparatus, data processing method, recording medium, and program according to the second embodiment of the present invention, a first write key that is transmitted from a first information processing apparatus and that permits writing data in the storage area is registered, writing data in the storage unit is controlled so that writing data in the storage area is permitted if a second write key that is transmitted from the first information processing apparatus or a second information processing apparatus matches the first write key when writing data in the storage area is requested by the first information processing apparatus or the second information processing apparatus, data stored in the storage area is encrypted by using an encryption key that is transmitted from the first information processing apparatus or the second information processing apparatus when the data stored in the storage area is read for the first time in response to a request for reading the data from the storage area from the first information processing apparatus or the second information processing apparatus, the encrypted data is transmitted to the first information processing apparatus or the second information processing apparatus when the data stored in the storage area is read for the first time in response to a request for reading the data from the storage area from the first information processing apparatus or the second information processing apparatus, and the encrypted data is read from the storage area and the read data is transmitted to the first information processing apparatus or the second information processing apparatus when the data stored in the storage area is read for the second time or thereafter.

According to the embodiments of the present invention, data can be transmitted/received more easily and safely.

BRIEF DESCRIPTION OF THE DRAWINGS

FIG. 1 shows an IC card system according to an embodiment of the present invention;

FIG. 2 shows an example of a format of a command transmitted/received in the IC card system shown in FIG. 1;

FIG. 16 is a flowchart illustrating a data writing process in the read-once service in the IC card system shown in FIG. 1; and FIG. 17 is a flowchart illustrating a data reading process in the read-once service in the IC card system shown in FIG. 1.

DESCRIPTION OF THE PREFERRED EMBODIMENTS

Figure 3:
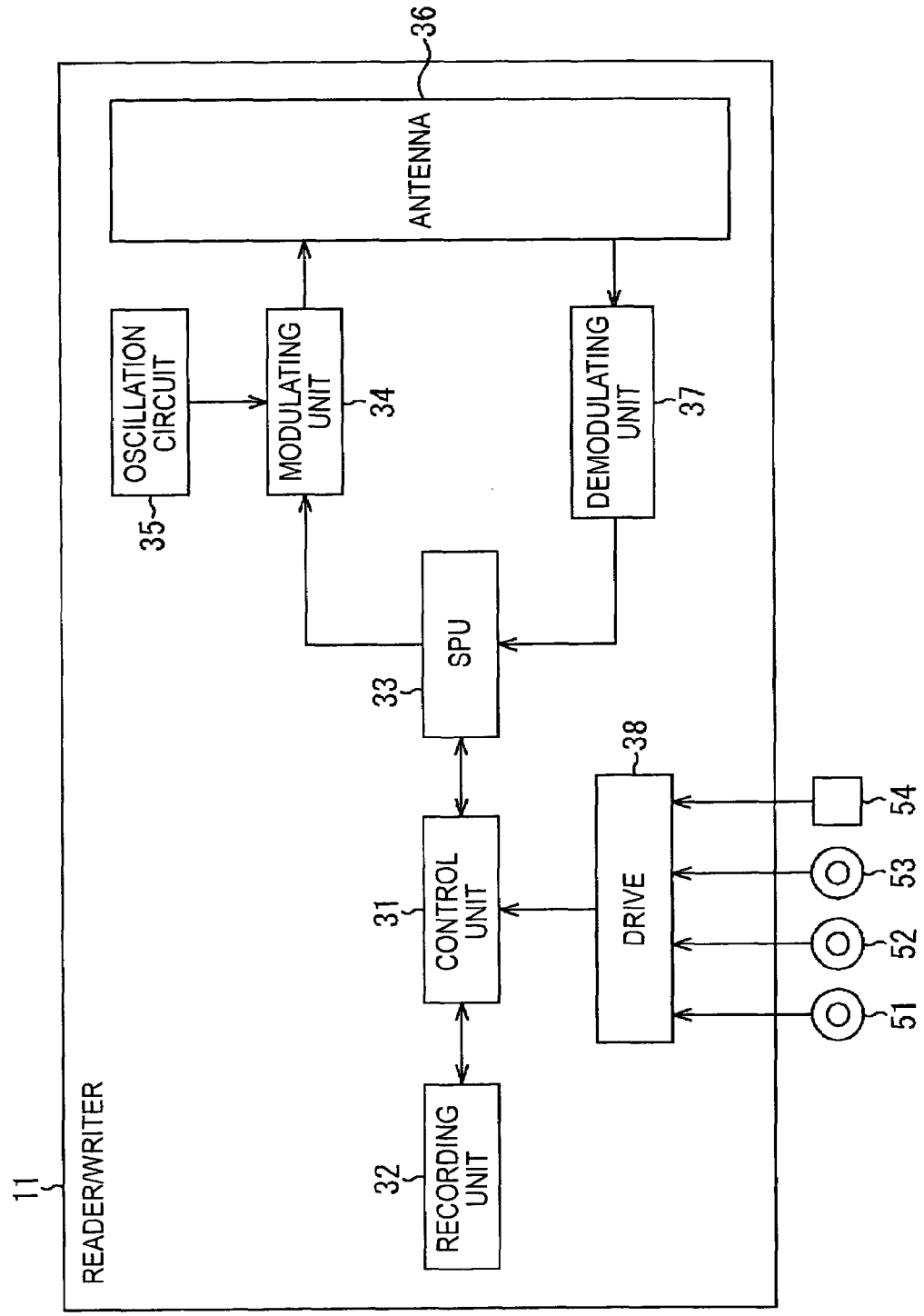
FIG. 3 is a block diagram showing an example of a configuration of a function of one of the reader/writers shown in FIG. 1.

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A data storage apparatus (e.g., the IC card 13 in FIG. 1) according to a first embodiment of the present invention is a data storage apparatus including a storage unit (e.g., the storage unit 207 in FIG. 7) having a storage area (e.g., the service area). The data storage apparatus includes: a read key registration unit (e.g., the service generating unit 234 in FIG. 8) registering a first read key that is transmitted from a first information processing apparatus (e.g., the reader/writer 11 in FIG. 1) and that permits reading data from the storage area; a write control unit (e.g., the write control unit 232 in FIG. 8) controlling writing data in the storage unit so that writing new data in the storage area is prohibited until data stored in the storage area is read for the first time; and a read control unit (e.g., the read control unit 233 in FIG. 8) controlling reading data from the storage unit so that reading data from the storage area is permitted if a second read key that is transmitted from the first information processing apparatus or a second information processing apparatus (e.g., the reader/writer 12 in FIG. 1) matches the first read key when reading data from the storage area is requested by the first information processing apparatus or the second information processing apparatus.

In the data storage apparatus (e.g., the IC card 13 in FIG. 1), the write control unit controls writing data in the storage unit so as to further write a digital signature (e.g., the signature) in the storage area, the digital signature being generated by encrypting data to be written in the storage area and being transmitted together with the data to be written in the storage area. When checking the data stored in the storage area is requested without the second key being transmitted from the first information processing apparatus or the second information processing apparatus, the read control unit controls reading data from the storage unit so as to read the digital signature from the storage area and to transmit the digital signature to the first information processing apparatus or the second information processing apparatus.

A data processing method according to the first embodiment of the present invention is a data processing method for a data storage apparatus (e.g., the IC card 13 in FIG. 1) including a storage unit (e.g., the storage unit 207 in FIG. 7) having a storage area (e.g., the service area). The data processing method includes the steps of: registering a first read key that is transmitted from a first information processing apparatus (e.g., the reader/writer 11 in FIG. 1) and that permits reading data from the storage area (e.g., step S12 in FIG. 9); controlling writing data in the storage unit so that writing new data in the storage area is prohibited until data stored in the storage area is read for the first time (e.g., steps S53 to S55 in FIG. 11); and controlling reading data from the storage unit so that reading data from the storage area is permitted if a second read key that is transmitted from the first information processing apparatus or a second information processing apparatus (e.g., the reader/writer 12 in FIG. 1) matches the first read key when reading data from the storage area is requested by the first information processing apparatus or the second information processing apparatus (e.g., steps S113 and S115 in FIG. 13).

Figure 5:
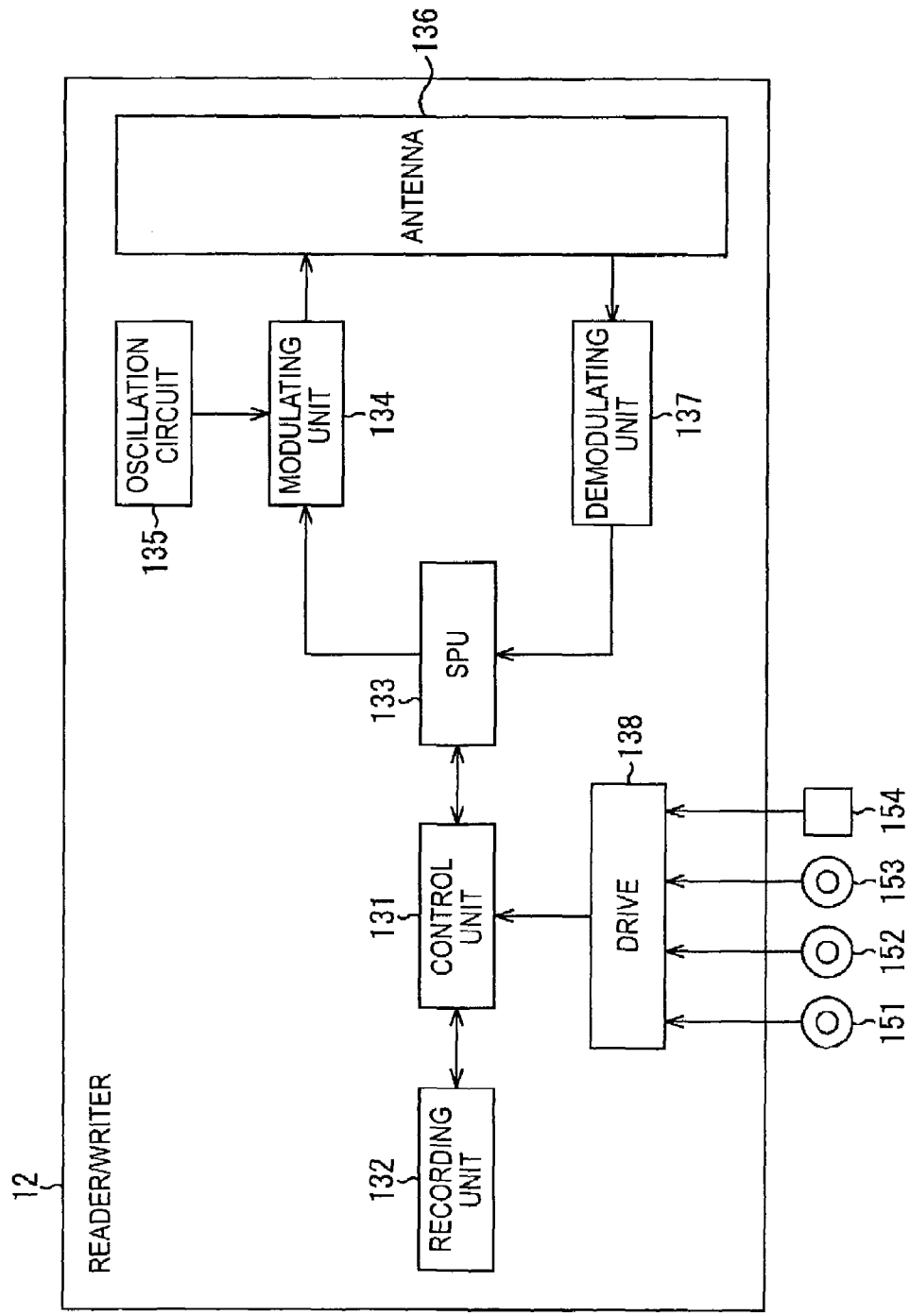
FIG. 5 is a block diagram showing an example of a configuration of a function of the other reader/writer shown in FIG. 1.

A program recorded in a recording medium (e.g., the magnetic disk 51, optical disc 52, magneto-optical disc 53, or semiconductor memory 54 in FIG. 3 or the magnetic disk 151, optical disc 152, magneto-optical disc 153, or semiconductor memory 154 in FIG. 5) according to the first embodiment of the present invention is a program for data processing performed in a data storage apparatus (e.g., the IC card 13 in FIG. 1) including a storage unit (e.g., the storage unit 207 in FIG. 7) having a storage area (e.g., the service area). The program includes the steps of: registering a first read key that is transmitted from a first information processing apparatus (e.g., the reader/writer 11 in FIG. 1) and that permits reading data from the storage area (e.g., step S12 in FIG. 9); controlling writing data in the storage unit so that writing new data in the storage area is prohibited until data stored in the storage area is read for the first time (e.g., steps S53 to S55 in FIG. 11); and controlling reading data from the storage unit so that reading data from the storage area is permitted if a second read key that is transmitted from the first information processing apparatus or a second information processing apparatus (e.g., the reader/writer 12 in FIG. 1) matches the first read key when reading data from the storage area is requested by the first information processing apparatus or the second information processing apparatus (e.g., steps S113 and S115 in FIG. 13).

A program according to the first embodiment of the present invention is a program allowing a data storage apparatus (e.g., the IC card 13 in FIG. 1) including a storage unit (e.g., the storage unit 207 in FIG. 7) having a storage area (e.g., the service area) to execute data processing. The program includes the steps of: registering a first read key that is transmitted from a first information processing apparatus (e.g., the reader/writer 11 in FIG. 1) and that permits reading data from the storage area (e.g., step S12 in FIG. 9); controlling writing data in the storage unit so that writing new data in the storage area is prohibited until data stored in the storage area is read for the first time (e.g., steps S53 to S55 in FIG. 11); and controlling reading data from the storage unit so that reading data from the storage area is permitted if a second read key that is transmitted from the first information processing apparatus or a second information processing apparatus (e.g., the reader/writer 12 in FIG. 1) matches the first read key when reading data from the storage area is requested by the first information processing apparatus or the second information processing apparatus (e.g., steps S113 and S115 in FIG. 13).

A data storage apparatus (e.g., the IC card 13 in FIG. 1) according to a second embodiment of the present invention is a data storage apparatus including a storage unit (e.g., the storage unit 207 in FIG. 7) having a storage area (e.g., the service area). The data storage apparatus includes: a write key registration unit (e.g., the service generating unit 234 in FIG. 8) registering a first write key that is transmitted from a first information processing apparatus (e.g., the reader/writer 11 in FIG. 1) and that permits writing data in the storage area; a write control unit (e.g., the write control unit 232 in FIG. 8) controlling writing data in the storage unit so that writing data in the storage area is permitted if a second write key that is transmitted from the first information processing apparatus or a second information processing apparatus (e.g., the reader/writer 12 in FIG. 1) matches the first write key when writing data in the storage area is requested by the first information processing apparatus or the second information processing apparatus; an encrypting unit (e.g., the encrypting unit 235 in FIG. 8) encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and a transmission control unit (e.g., the read control unit 233 in FIG. 8) transmitting the data encrypted by the encrypting unit to the first information processing apparatus or the second information processing apparatus when the data stored in the storage area is read for the first time in response to a request for reading the data from the storage area from the first information processing apparatus or the second information processing apparatus and reading the data encrypted by the encrypting unit from the storage area and transmitting the read data to the first information processing apparatus or the second information processing apparatus when the data stored in the storage area is read for the second time or thereafter.

A data processing method according to the second embodiment of the present invention is a data processing method for a data storage apparatus (e.g., the IC card 13 in FIG. 1) including a storage unit (e.g., the storage unit 207 in FIG. 7) having a storage area (e.g., the service area). The data processing method includes the steps of: registering a first write key that is transmitted from a first information processing apparatus (e.g., the reader/writer 11 in FIG. 1) and that permits writing data in the storage area (e.g., step S212 in FIG. 14); controlling writing data in the storage unit so that writing data in the storage area is permitted if a second write key that is transmitted from the first information processing apparatus or a second information processing apparatus (e.g., the reader/writer 12 in FIG. 1) matches the first write key when writing data in the storage area is requested by the first information processing apparatus or the second information processing apparatus (e.g., steps S253 and 254 in FIG. 16); encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus (e.g., step S284 in FIG. 17); and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter (e.g., step S286 in FIG. 17).

A program recorded in a recording medium (e.g., the magnetic disk 51, optical disc 52, magneto-optical disc 53, or semiconductor memory 54 in FIG. 3 or the magnetic disk 151, optical disc 152, magneto-optical disc 153, or semiconductor memory 154 in FIG. 5) according to the second embodiment of the present invention is a program for data processing performed in a data storage apparatus (e.g., the IC card 13 in FIG. 1) including a storage unit (e.g., the storage unit 207 in FIG. 7) having a storage area (e.g., the service area). The program includes the steps of: registering a first write key that is transmitted from a first information processing apparatus (e.g., the reader/writer 11 in FIG. 1) and that permits writing data in the storage area (e.g., step S212 in FIG. 14); controlling writing data in the storage unit so that writing data in the storage area is permitted if a second write key that is transmitted from the first information processing apparatus or a second information processing apparatus (e.g., the reader/writer 12 in FIG. 1) matches the first write key when writing data in the storage area is requested by the first information processing apparatus or the second information processing apparatus (e.g., steps S253 and S254 in FIG. 16); encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus (e.g., step S284 in FIG. 17); and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter (e.g., step S286 in FIG. 17).

A program according to the second embodiment of the present invention is a program allowing a data storage apparatus (e.g., the IC card 13 in FIG. 1) including a storage unit (e.g., the storage unit 207 in FIG. 7) having a storage area (e.g., the service area) to execute data processing. The program includes the steps of: registering a first write key that is transmitted from a first information processing apparatus (e.g., the reader/writer 11 in FIG. 1) and that permits writing data in the storage area (e.g., step S212 in FIG. 14); controlling writing data in the storage unit so that writing data in the storage area is permitted if a second write key that is transmitted from the first information processing apparatus or a second information processing apparatus (e.g., the reader/writer 12 in FIG. 1) matches the first write key when writing data in the storage area is requested by the first information processing apparatus or the second information processing apparatus (e.g., steps S253 and S254 in FIG. 16); encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus (e.g., step S284 in FIG. 17); and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter (e.g., step S286 in FIG. 17).

Hereinafter, embodiments of the present invention are described with reference to the drawings.

FIG. 1 shows a noncontact IC card system 1 according to an embodiment of the present invention. In the noncontact IC card system 1, a reader/writer 11 or a reader/writer 12 transmits/receives data to/from an IC card 13 in a noncontact manner by using electromagnetic waves. For example, in the noncontact IC card system 1, the reader/writer 11 is owned by an owner of the IC card 13 whereas the reader/writer 12 is owned by a service provider providing various services through the IC card 13.

FIG. 2 shows an example of a format of a command transmitted/received between the reader/writer 11 and the IC card 13 or between the reader/writer 12 and the IC card 13.

The command is composed of a CMD (command) field, a LEN (length) field, a data field, a data signature field, and a CRC (cyclic redundancy check) field.

In the CMD field, a command code for providing instructions to perform various processes or transmitting various information between the reader/writer 11 and the IC card 13 or between the reader/writer 12 and the IC card 13 is set.

In the LEN field, a data length (e.g., the number of bytes) from the data field to the CRC field is set.

In the data field, various data transmitted/received between the reader/writer 11 and the IC card 13 or between the reader/writer 12 and the IC card 13 is stored.

In the data signature field, a digital signature generated by encrypting the data stored in the data field is stored as necessary. The signature is, for example, a hash value generated based on the data stored in the data field by using a hash function, such as MD5 (Message Digest 5), including an irreversible one-way function.

In the CRC field, a CRC code according to a CRC method, which is a method for detecting an error in data transmission, is set.

Information required to transmit/receive the command, such as an apparatus ID for identifying the reader/writer 11 or 12 or a card ID for identifying the IC card 13, is added to the command shown in FIG. 2 and the command is transmitted/received.

FIG. 3 is a block diagram showing an example of a configuration of a function of the reader/writer 11. The reader/writer 11 includes a control unit 31, a recording unit 32, a signal processing unit (SPU) 33, a modulating unit 34, an oscillation circuit 35, an antenna 36, a demodulating unit 37, and a drive 38.

The control unit 31 reads and executes a program supplied through a recording medium that is loaded as necessary to the drive 38, so as to control the entire reader/writer 11. When a program or data is supplied from the drive 38, the control unit 31 records the supplied program or data in the recording unit 32 as necessary. Then, the control unit 31 reads and executes the program recorded in the recording unit 32 to control the entire reader/writer 11.

The control unit 31 generates a command to allow the IC card 13 to execute a predetermined process and supplies the generated command to the SPU 33. Also, the control unit 31 executes a process in response to a command transmitted from the IC card 13 through the SPU 33. Further, the control unit 31 executes a process in response to instructions input by a user through an operation unit (not shown).

The recording unit 32 includes a so-called nonvolatile storage medium or recording medium which is rewritable and which can hold recorded data even when the power is shut down, e.g., a hard disk or a flash memory. The recording unit 32 records a program and data used by the control unit 31.

The SPU 33 encodes a command supplied from the control unit 31 in a predetermined method and supplies the encoded command to the modulating unit 34. Also, the SPU 33 decodes data supplied from the demodulating unit 37 in a method corresponding to the encoding method and supplies the decoded data to the control unit 31.

For example, when the SPU 33 receives a command to be transmitted to the IC card 13 from the control unit 31, the SPU 33 performs encoding, such as Manchester encoding, on the command, and then outputs the obtained signal to the modulating unit 34. On the other hand, when the SPU 33 receives data from the IC card 13 through the demodulating unit 37, the SPU 33 performs decoding, such as Manchester decoding, on the data, and supplied the obtained signal to the control unit 31.

The modulating unit 34 generates carrier waves based on a clock signal of a predetermined frequency supplied from the oscillation circuit 35. Also, the modulating unit 34 modulates a command supplied from the SPU 33 in a predetermined method based on the carrier waves and supplies the modulated command to the antenna 36. For example, the modulating unit 34 generates a modulated command by changing the phase, amplitude, and frequency of the carrier waves based on the command supplied from the SPU 33.

More specifically, the modulating unit 34 modulates data supplied from the SPU 33 by amplitude shift keying (ASK) by using a clock signal of 13.56 Hz supplied from the oscillation circuit 35 as carrier waves, so as to generate modulated waves. The modulated waves are output as electromagnetic waves from the antenna 36.

The oscillation circuit 35 generates a reference clock signal having a predetermined frequency and supplies the generated clock signal to the modulating unit 34.

The antenna 36 transmits a command supplied from the modulating unit 34 to the IC card 13 by wireless communication. That is, the antenna 36 radiates electromagnetic waves to transmit the command supplied from the modulating unit 34. Also, the antenna 36 receives data transmitted from the IC card 13 and supplies the received data to the demodulating unit 37.

The demodulating unit 37 demodulates the data supplied from the antenna 36 in a demodulating method corresponding to the modulating method used in a modulating unit 209 of the IC card 13 (FIG. 7) and supplies the demodulated data to the SPU 33. For example, the demodulating unit 37 demodulates modulated waves (ASK modulated waves) obtained through the antenna 36 and outputs the demodulated data to the SPU 33.

The drive 38 drives a magnetic disk 51, an optical disc 52, a magneto-optical disc 53, or a semiconductor memory 54 when they are loaded thereto and obtains a program or data recorded thereon. The obtained program or data is transferred to the control unit 31 or the IC card 13. The program transferred (transmitted) to the IC card 13 is recorded or executed by the IC card 13 as necessary.

Figure 4:
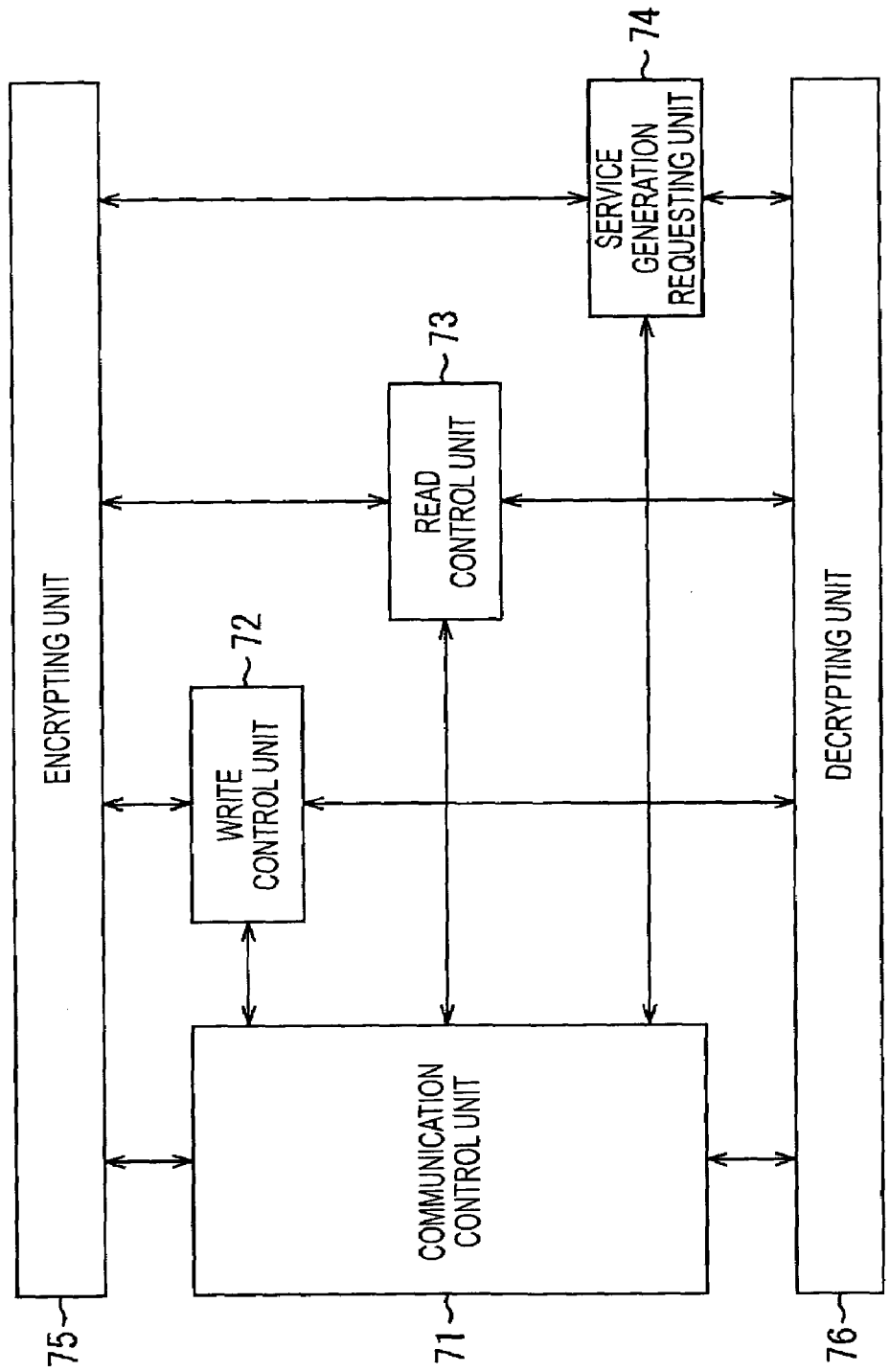
FIG. 4 is a block diagram showing an example of a configuration of a function realized by a control unit of the reader/writer shown in FIG. 3.

FIG. 4 is a block diagram showing an example of a configuration of a function realized by the control unit 31 executing a predetermined program. When the control unit 31 executes the program, a communication control unit 71, a write control unit 72, a read control unit 73, a service generation requesting unit 74, an encrypting unit 75, and a decrypting unit 76 are realized.

The communication control unit 71 transmits a polling command through the SPU 33, the modulating unit 34, and the antenna 36. When a polling response command for the polling command is transmitted from the IC card 13, the communication control unit 71 receives the polling response command through the antenna 36, the demodulating unit 37, and the SPU 33. After receiving the polling response command from the IC card 13, the communication control unit 71 performs a session establishing process, such as mutual authentication with the IC card 13, through the SPU 33, the modulating unit 34 or the demodulating unit 37, and the antenna 36, so as to establish a communication session between the reader/writer 11 and the IC card 13.

The communication control unit 71 receives various commands transmitted from the IC card 13 through the antenna 36, the demodulating unit 37, and the SPU 33. Then the communication control unit 71 checks a data length of the received command based on a value set in the LEN field and detects an error of data of the command based on the CRC code. Further, the communication control unit 71 supplies the received command to the write control unit 72, the read control unit 73, or the service generation requesting unit 74 as necessary. Further, the communication control unit 71 adds necessary information to various commands supplied from the write control unit 72, the read control unit 73, or the service generation requesting unit 74 so that the commands can be transmitted, and transmits the commands with the information to the IC card 13 through the SPU 33, the modulating unit 34, and the antenna 36.

The write control unit 72 generates a write command to request writing data in the IC card 13 and supplies the generated write command to the communication control unit 71, as described below with reference to FIG. 16. Also, the write control unit 72 obtains a write end notification command, which is a response to the write command from the IC card 13, through the communication control unit 71.

Figure 13:
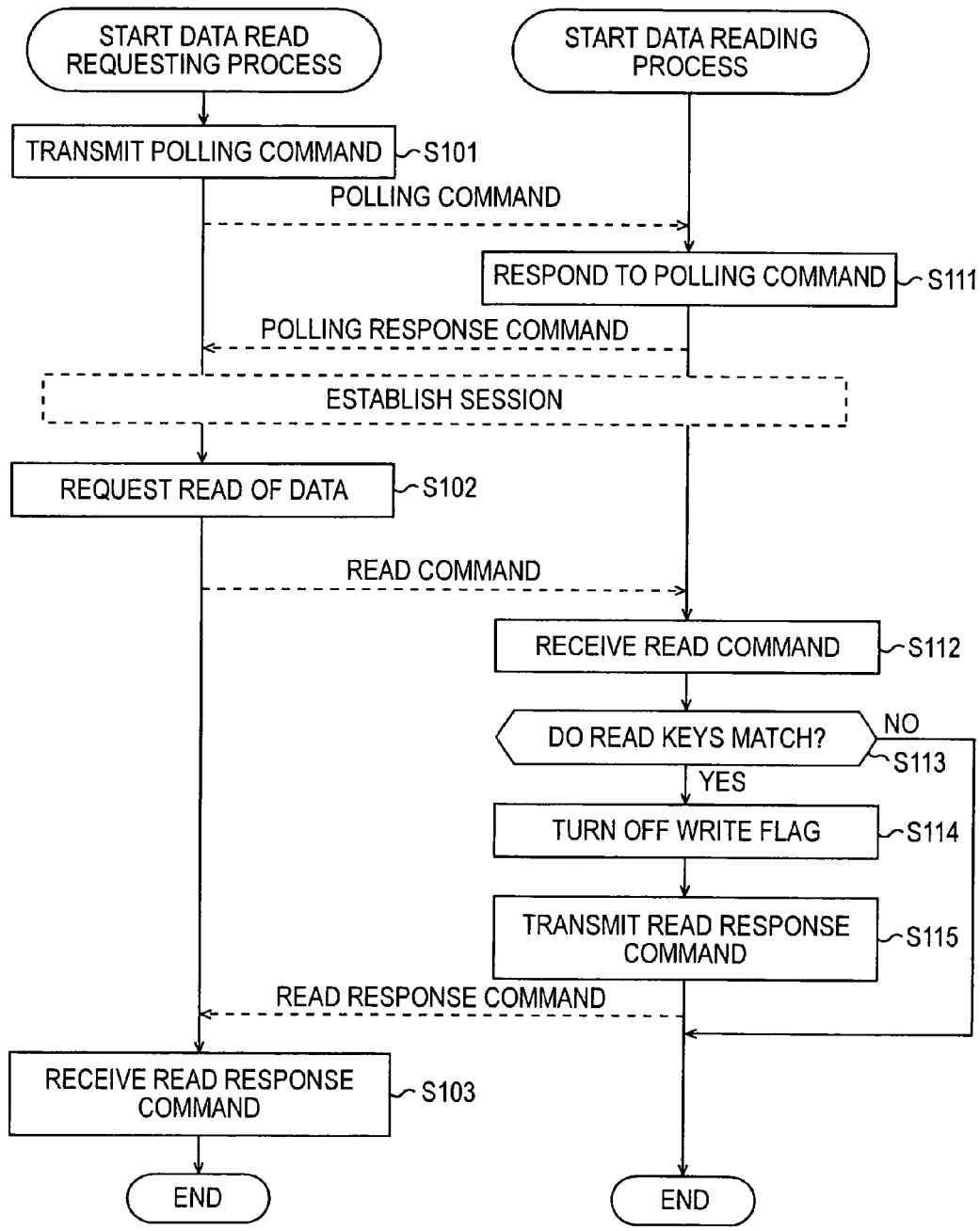
FIG. 13 is a flowchart illustrating a data reading process in the write-once service in the IC card system shown in FIG. 1.

The read control unit 73 generates a read command to request reading data from the IC card 13 and supplies the generated read command to the communication control unit 71, as described below with reference to FIG. 13. Also, the read control unit 73 obtains a read response command, which is a response to the read command from the IC card 13, through the communication control unit 71. The read control unit 73 supplies data that is stored in the read response command and that is read from the IC card 13 to each unit of the reader/writer 11 or records the data in the recording unit 32 as necessary.

The service generation requesting unit 74 generates a service generation requesting command to request generation of various services to the IC card 13 and supplies the generated service generation requesting command to the communication control unit 71. For example, the service generation requesting unit 74 allows the IC card 13 to generate a write-once service (described below with reference to FIGS. 9 to 13) or a read-once service (described below with reference to FIGS. 14 to 17). Also, the service generation requesting unit 74 obtains a service generation notification command, which is a response to the service generation requesting command from the IC card 13, through the communication control unit 71.

The encrypting unit 75 encrypts various data. For example, the encrypting unit 75 encrypts data supplied from the communication control unit 71, the write control unit 72, the read control unit 73, or the service generation requesting unit 74, and returns the encrypted data to the source of the data.

The decrypting unit 76 decrypts various data. For example, the decrypting unit 76 decrypts data supplied from the communication control unit 71, the write control unit 72, the read control unit 73, or the service generation requesting unit 74, and returns the decrypted data to the source of the data.

FIG. 5 is a block diagram showing an example of a configuration of a function of the reader/writer 12. The reader/writer 12 includes a control unit 131, a recording unit 132, an SPU 133, a modulating unit 134, an oscillation circuit 135, an antenna 136, a demodulating unit 137, and a drive 138. In FIG. 5, elements corresponding to those shown in FIG. 3 are denoted by reference numerals whose last two digits are the same as in FIG. 3, and the corresponding description is not repeated.

The control unit 131 reads and executes a program supplied through a recording medium that is loaded as necessary to the drive 138, so as to control the entire reader/writer 12. When a program or data is supplied from the drive 138, the control unit 131 records the supplied program or data in the recording unit 132 as necessary. Then, the control unit 131 reads and executes the program recorded in the recording unit 132 to control the entire reader/writer 12.

The control unit 131 generates a command to allow the IC card 13 to execute a predetermined process and supplies the generated command to the SPU 133. Also, the control unit 131 executes a process in response to a command transmitted from the IC card 13 through the SPU 133. Further, the control unit 131 executes a process in response to instructions input by a user through an operation unit (not shown).

Figure 6:
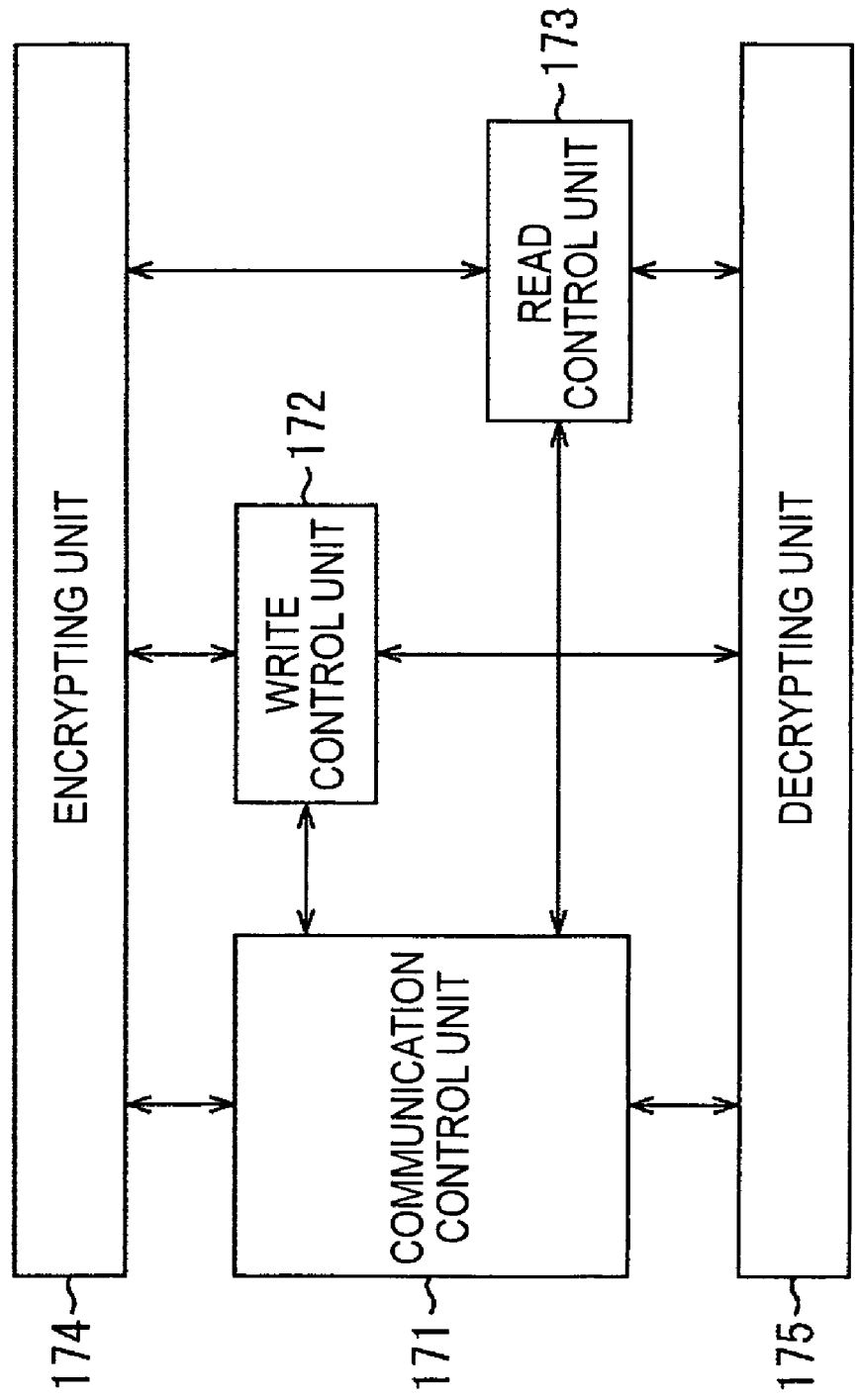
FIG. 6 is a block diagram showing an example of a configuration of a function realized by a control unit of the reader/writer shown in FIG. 5.

FIG. 6 is a block diagram showing an example of a configuration of a function realized by the control unit 131 executing a predetermined program. When the control unit 131 executes the program, a communication control unit 171, a write control unit 172, a read control unit 173, an encrypting unit 174, and a decrypting unit 175 are realized.

The communication control unit 171 transmits a polling command through the SPU 133, the modulating unit 134, and the antenna 136. When a polling response command for the polling command is transmitted from the IC card 13, the communication control unit 171 receives the polling response command through the antenna 136, the demodulating unit 137, and the SPU 133. After receiving the polling response command from the IC card 13, the communication control unit 171 performs a session establishing process, such as mutual authentication with the IC card 13, through the SPU 133, the modulating unit 134 or the demodulating unit 137, and the antenna 136, so as to establish a communication session between the reader/writer 12 and the IC card 13.

The communication control unit 171 receives various commands transmitted from the IC card 13 through the antenna 136, the demodulating unit 137, and the SPU 133. Then the communication control unit 171 checks a data length of the received command based on a value set in the LEN field and detects an error of data of the command based on the CRC code. Further, the communication control unit 171 supplies the received command to the write control unit 172 or the read control unit 173 as necessary. Further, the communication control unit 171 adds necessary information to various commands supplied from the write control unit 172 or the read control unit 173 so that the commands can be transmitted, and transmits the commands with the information to the IC card 13 through the SPU 133, the modulating unit 134, and the antenna 136.

The write control unit 172 generates a write command to request writing data in the IC card 13 and supplies the generated write command to the communication control unit 171, as described below with reference to FIG. 11. Also, the write control unit 172 obtains a write end notification command, which is a response to the write command from the IC card 13, through the communication control unit 171.

Also, the write control unit 172 generates a data check command to request checking the data written in the IC card 13 and supplies the generated data check command to the communication control unit 171, as described below with reference to FIG. 12. Then, the write control unit 172 receives a data check response command, which is a response to the data check command from the IC card 13, through the communication control unit 171.

The read control unit 173 generates a read command to request reading data from the IC card 13 and supplies the generated read command to the communication control unit 171, as described below with reference to FIG. 12. Also, the read control unit 173 obtains a read response command, which is a response to the read command from the IC card 13, through the communication control unit 171. The read control unit 173 supplies data that is stored in the read response command and that is read from the IC card 13 to each unit of the reader/writer 12 or records the data in the recording unit 132 as necessary.

The encrypting unit 174 encrypts various data. For example, the encrypting unit 174 encrypts data supplied from the communication control unit 171, the write control unit 172, or the read control unit 173, and returns the encrypted data to the source of the data.

The decrypting unit 175 decrypts various data. For example, the decrypting unit 175 decrypts data supplied from the communication control unit 171, the write control unit 172, or the read control unit 173, and returns the decrypted data to the source of the data.

Figure 7:
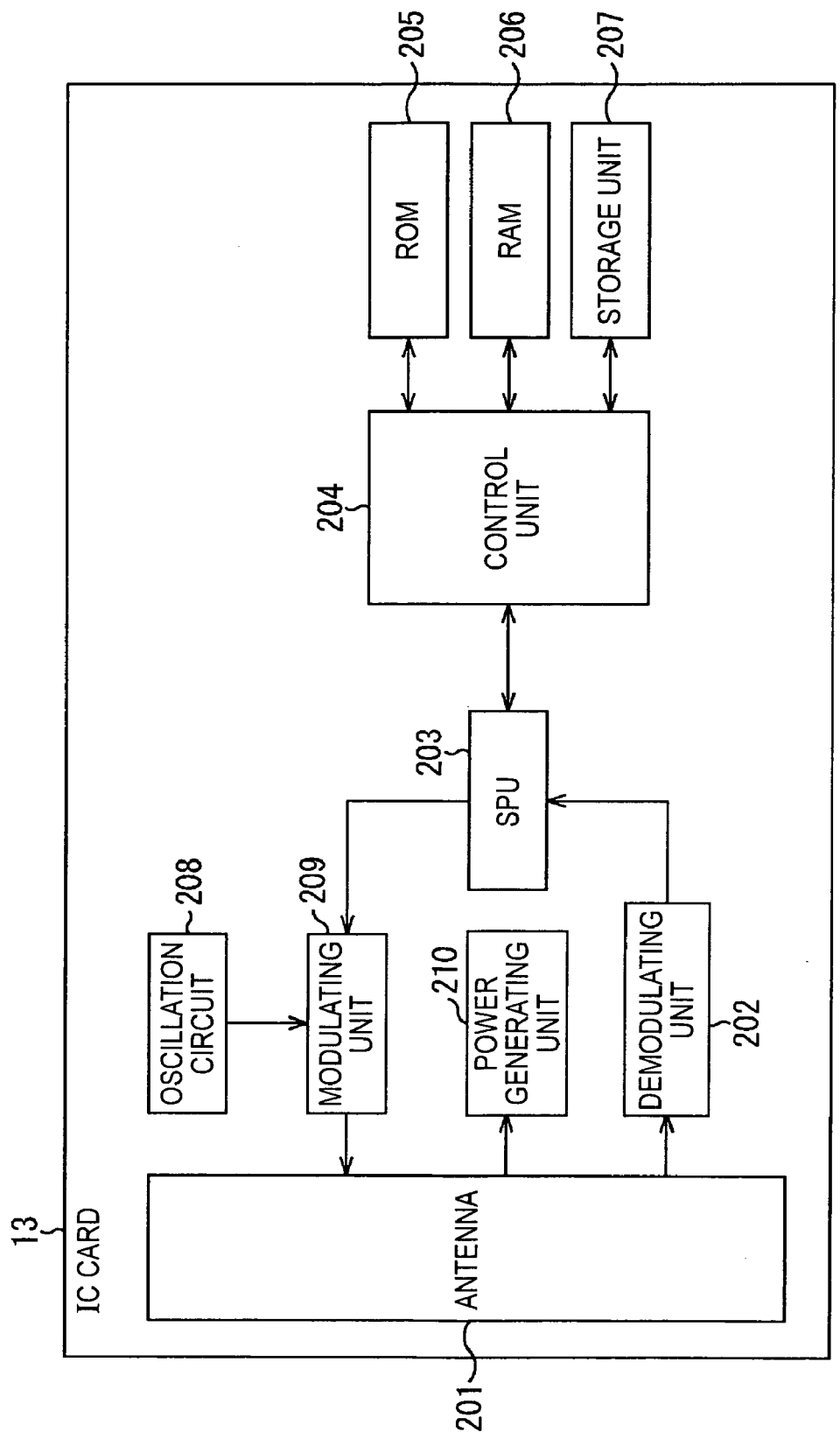
FIG. 7 is a block diagram showing an example of a configuration of a function of the IC card shown in FIG. 1.

FIG. 7 is a block diagram showing an example of a configuration of a function of the IC card 13. The IC card 13 includes an antenna 201, a demodulating unit 202, an SPU 203, a control unit 204, a read only memory (ROM) 205, a random access memory (RAM) 206, a storage unit 207, an oscillation circuit 208, a modulating unit 209, and a power generating unit 210.

The antenna 201 receives a command transmitted from the reader/writer 11 or 12 and supplies the received command to the demodulating unit 202. Also, the antenna 201 transmits data (e.g., command) supplied from the modulating unit 209 to the reader/writer 11 or 12 by wireless communication. In other words, the antenna 201 radiates electromagnetic waves to transmit data supplied from the modulating unit 209. Further, electromagnetic waves of a predetermined frequency radiated from the reader/writer 11 or 12 cause resonation in the antenna 201, so that an electromotive force is generated therein.

The demodulating unit 202 demodulates a command supplied from the antenna 201 by using a demodulating method corresponding to the modulating method in the modulating unit 34 of the reader/writer 11 or the modulating unit 134 of the reader/writer 12 and supplies the demodulated command to the SPU 203. For example, the demodulating unit 202 detects an envelope of a command, which is ASK modulated waves received through the antenna 201, so as to demodulate the command, and then outputs the demodulated command to the SPU 203.

The SPU 203 decodes the command supplied from the demodulating unit 202 in a predetermined method and supplies the decoded command to the control unit 204. The SPU 203 encodes data supplied from the control unit 204 in a predetermined encoding method and supplies the encoded data to the modulating unit 209. For example, when a command demodulated in the demodulating unit 202 is encoded by a Manchester method, the SPU 203 decodes the command (decodes the Manchester code) based on a clock signal supplied from a phase locked loop (PLL) circuit (not shown) and supplies the decoded command to the control unit 204. For example, the SPU 203 encodes data supplied from the control unit 204 by the Manchester method and supplies the encoded data to the modulating unit 209.

The control unit 204 reads a program stored or recorded in the ROM 205 or the storage unit 207 as necessary and executes the read program in order to control the entire IC card 13. Also, the control unit 204 executes processes in response to various commands supplied from the SPU 203. Further, the control unit 204 generates a command to respond to a command transmitted from the reader/writer 11 or 12 and supplies the command to the SPU 203.

The ROM 205 stores a program for allowing the control unit 204 to execute various processes and other data.

The RAM 206 temporarily stores data used by the control unit 204 to execute various processes.

The storage unit 207 includes a nonvolatile memory, such as a flash memory, an electrically erasable programmable read only memory (EEPROM), a magnetoresistive random access memory (MRAM), or a ferroelectric memory (Fe-RAM), and stores data specified by the reader/writer 11 or 12 to be written, a program allowing the control unit 204 to execute various processes, and other data.

The oscillation circuit 208 generates a clock signal having the same frequency as that of a command received by the antenna 201 and supplies the generated clock signal to the modulating unit 209. For example, the oscillation circuit 208 includes a PLL circuit therein and generates a clock signal having the same frequency as the clock frequency of the command.

The modulating unit 209 generates carrier waves based on the clock signal of the predetermined frequency supplied from the oscillation circuit 208. The modulating unit 209 modulates data supplied from the SPU 203 based on the carrier waves by using a predetermined method so as to generate modulated data and supplies the modulated data to the antenna 201. For example, the modulating unit 209 further modulates data that has been encoded by the Manchester method supplied from the SPU 203 by ASK modulation and transmits the modulated data to the reader/writer 11 or 12 through the antenna 201.

The modulating unit 209 turns ON/OFF a predetermined switching device (not shown) to the data supplied from the SPU 203. Only when the switching device is in an ON-state, the modulating unit 209 connects a predetermined load to the antenna 201 in parallel so as to vary the load of the antenna 201. The ASK-modulated data is transmitted to the reader/writer 11 or 12 through the antenna 201 using the variation in the load of the antenna 201 (a terminal voltage of the antenna 36 of the reader/writer 11 or the antenna 136 of the reader/writer 12 is varied).

The power generating unit 210 generates a DC power based on an AC electromotive force generated in the antenna 201 and supplies the generated DC power to each unit of the IC card 13.

Figure 8:
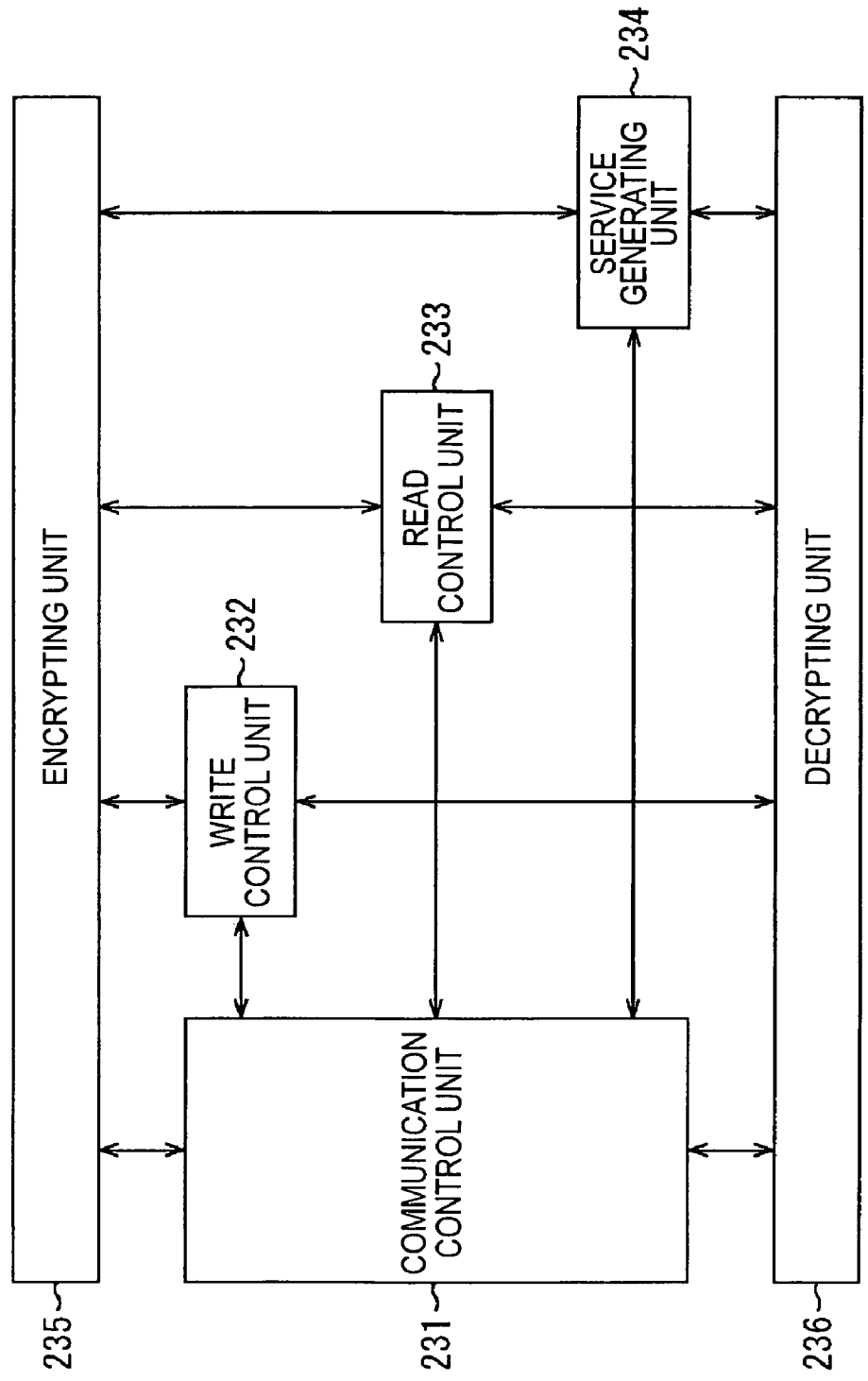
FIG. 8 is a block diagram showing an example of a configuration of a function realized by a control unit of the IC card.

FIG. 8 is a block diagram showing an example of a configuration of a function realized by the control unit 204 executing a predetermined program. When the control unit 204 executes the program, a communication control unit 231, a write control unit 232, a read control unit 233, a service generating unit 234, an encrypting unit 235, and a decrypting unit 236 are realized.

The communication control unit 231 receives a polling command from the reader/writer 11 or 12 through the antenna 201, the demodulating unit 202, and the SPU 203 and transmits a polling response command to the reader/writer 11 or 12 through the SPU 203, the modulating unit 209, and the antenna 201. The communication control unit 231 performs a session establishing process by performing mutual authentication with the reader/writer 11 or 12 through the SPU 203, the modulating unit 209 or the demodulating unit 202, and the antenna 201, so as to establish a communication session between the reader/writer 11 or 12 and the IC card 13.

The communication control unit 231 receives various commands transmitted from the reader/writer 11 or 12 through the antenna 201, the demodulating unit 202, and the SPU 203, and checks a data length of the received command based on a value set in the LEN field or detects an error of data of the command based on the CRC code. The communication control unit 231 supplies the received command to the write control unit 232, the read control unit 233, or the service generating unit 234 as necessary. Also, the communication control unit 231 adds necessary information to various commands supplied from the write control unit 232, the read control unit 233, or the service generating unit 234 so that the commands can be transmitted, and transmits the commands with the information to the reader/writer 11 or 12 through the SPU 203, the modulating unit 209, and the antenna 201.

As described below with reference to FIG. 11 or 16, the write control unit 232 obtains a write command transmitted from the reader/writer 11 or 12 through the communication control unit 231 and writes data stored in the write command in the storage unit 207. Also, the write control unit 232 generates a write end notification command, which is a response to the write command, and supplies the generated write end notification command to the communication control unit 231.

As described below with reference to FIG. 13 or 17, the read control unit 233 obtains a read command transmitted from the reader/writer 11 or 12 through the communication control unit 231. Also, the read control unit 233 reads data from the storage unit 207 based on the read command, generates a read response command that stores the read data therein, and supplies the generated read response command to the communication control unit 231.

As described below with reference to FIG. 12, the read control unit 233 obtains a data check command transmitted from the reader/writer 11 or 12 through the communication control unit 231. Based on the data check command, the read control unit 233 reads a signature stored with the data to be checked from the storage unit 207 and generates a data check response command storing the read signature. Then, the read control unit 233 supplies the generated data check response command to the communication control unit 231.

The service generating unit 234 obtains a service generation requesting command transmitted from the reader/writer 11 or 12 through the communication control unit 231 and generates various services in the storage unit 207 based on the service generation requesting command. For example, the service generating unit 234 generates a write-once service as described below with reference to FIG. 9 or generates a read-once service as described below with reference to FIG. 14. The service generating unit 234 generates a service generation notification command, which is a response to the service generation requesting command, and supplies the generated service generation notification command to the communication control unit 231.

The encrypting unit 235 encrypts various data. For example, the encrypting unit 235 encrypts data supplied from the communication control unit 231, the write control unit 232, or the read control unit 233, and returns the encrypted data to the source of the data.

The decrypting unit 236 decrypts various data. For example, the decrypting unit 236 decrypts data supplied from the communication control unit 231, the write control unit 232, or the read control unit 233, and returns the decrypted data to the source of the data.

Now, a process performed in the IC card system 1 using a write-once service is described with reference to FIGS. 9 to 13.

First, a write-once service generating process performed in the IC card system 1 is described with reference to the flowchart shown in FIG. 9.

A write-once service generation requesting process performed by the reader/writer 11 in the write-once service generating process is described.

In step S1, the communication control unit 71 of the reader/writer 11 transmits a polling command. More specifically, the communication control unit 71 generates a polling command in which a command code indicating polling is performed at predetermined intervals is set in the CMD field, and transmits the generated polling command through the SPU 33, the modulating unit 34, and the antenna 36.

When the IC card 13 is brought close to the reader/writer 11 and receives the polling command transmitted from the reader/writer 11, the IC card 13 transmits a polling response command, which is a response to the polling command, in step S11 (described below).

Then, the communication control unit 71 receives the polling response command transmitted from the IC card 13 through the antenna 36, the demodulating unit 37, and the SPU 33, performs a session establishing process by performing mutual authentication with the IC card 13 so as to establish a communication session between the reader/writer 11 and the IC card 13, and then the process proceeds to step S2.

In step S2, the service generation requesting unit 74 requests generation of a write-once service to the IC card 13. More specifically, the service generation requesting unit 74 generates a service generation requesting command by setting a command code requesting generation of a write-once service in the CMD field and by storing data required to generate a write service in the data field. The required data includes the number of areas to be ensured in the write-once service (hereinafter called service areas), numbers assigned to the service areas (hereinafter called service area numbers), the size of each service area, and a read key for permitting reading data from each service area. The service generation requesting unit 74 transmits the generated service generation requesting command to the IC card 13 through the communication control unit 71, the SPU 33, the modulating unit 34, and the antenna 36.

The IC card 13 receives the service generation requesting command and generates a write-once service in step S12 (described below) and then transmits a service generation notification command, which is a response to the service generation requesting command, in step S13.

In step S3, the service generation requesting unit 74 receives the service generation notification command transmitted from the IC card 13 through the antenna 36, the demodulating unit 37, the SPU 33, and the communication control unit 71, and then the write-once service generation requesting process ends.

Next, a write-once service generating process performed by the IC card 13 in accordance with the write-once service generation requesting process performed by the reader/writer 11 is described.

In step S11, the communication control unit 231 of the IC card 13 responds to the polling command. More specifically, the communication control unit 231 receives the polling command that is transmitted from the reader/writer 11 in the above-described step S1 through the antenna 201, the demodulating unit 202, and the SPU 203. Then, the communication control unit 231 generates a polling response command by setting a command code indicating to respond to the polling in the CMD field and by storing a card ID and so on of the IC card 13 in the data field, and then transmits the generated polling response command to the reader/writer 11 through the SPU 203, the modulating unit 209, and the antenna 201.

Then, the communication control unit 231 performs a session establishing process by performing mutual authentication with the reader/writer 11 so as to establish a communication session between the reader/writer 11 and the IC card 13, and the process proceeds to step S12.

In step S12, the service generating unit 234 generates a write-once service. More specifically, the service generating unit 234 receives the service generation requesting command transmitted from the reader/writer 11 in the above-described step S2 through the antenna 201, the demodulating unit 202, the SPU 203, and the communication control unit 231. The service generating unit 234 ensures service areas whose number and size are specified by the service generation requesting command in the storage unit 207 and sets service area numbers assigned by the service generation requesting command to the respective service areas (stores the numbers in a predetermined position of the service areas).

The service generating unit 234 registers read keys for permitting reading data from the respective service areas, the read keys being stored in the data field of the service generation requesting command (stores the read keys in a predetermined position of the service areas). Also, the service generating unit 234 ensures an area for storing a write flag indicating possible/impossible to write data in each service area in a predetermined position of the service area, and sets a write flag value to OFF so that writing data is permitted.

Figure 10:
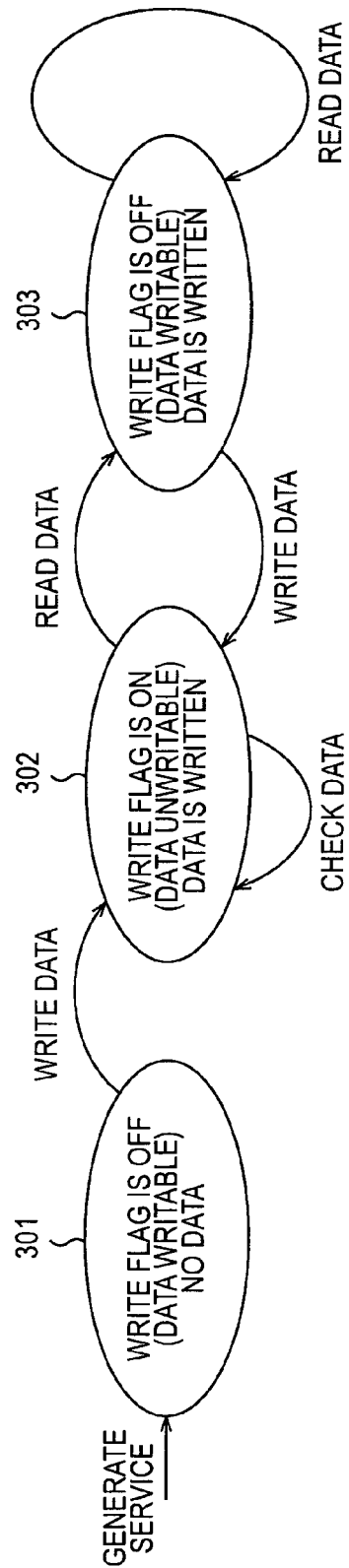
FIG. 10 illustrates transition of a state of a service area in a write-once service.

Accordingly, each service area of the write-once service is set to a state 301 shown in FIG. 10. That is, the write flag is in an OFF-state, data can be written in the service area, and no data has been written in the service area.

Herein, different read keys may be registered in the respective service areas or the same read keys may be registered in the respective service areas. When different read keys are registered in the respective service areas, all of the read keys may be stored in the data field of the service generation requesting command or a plurality of read keys may be generated from one or more read keys by calculation. Alternatively, service areas of a write-once service may be registered (ensured) in the storage unit 207 by another process in advance and read keys may be registered in the registered service areas by the reader/writer 11.

In step S13, the service generating unit 234 transmits a service generation notification command to the reader/writer 11, so that the write-once service generating process ends. More specifically, the service generating unit 234 generates a service generation notification command by setting a command code indicating end of service generation in the CMD field and by storing data indicating a generation result of the write-once service (whether or not the service has been successfully generated) in the data field. Then, the service generating unit 234 transmits the generated service generation notification command to the reader/writer 11 through the communication control unit 231, the SPU 203, the modulating unit 209, and the antenna 201.

Then, a user who has generated the write-once service in the IC card 13 by using the reader/writer 11 transmits the IC card 13 to another user (owner of the reader/writer 12) who is requested to write data in the service area of the write-once service and notifies the user of the service area number of the service area in which data should be written. As described below, no problem occurs in terms of security even if the service area number leaks to a third party. Therefore, the service area number need not be secretly transmitted under various security measures and can be easily managed.

Next, a data writing process in the write-once service performed between the reader/writer 12 and the IC card 13 is described with reference to the flowchart shown in FIG. 11.

First, a data write requesting process performed by the reader/writer 12 is described.

In step S41, the communication control unit 171 of the reader/writer 12 transmits a polling command. More specifically, the communication control unit 171 generates a polling command in which a command code indicating polling is performed at predetermined intervals is set in the CMD field, and transmits the generated polling command through the SPU 133, the modulating unit 134, and the antenna 136.

When the IC card 13 is brought close to the reader/writer 12 and receives the polling command transmitted from the reader/writer 12, the IC card 13 transmits a polling response command, which is a response to the polling command, in step S51 (described below).

Then, the communication control unit 171 receives the polling response command transmitted from the IC card 13 through the antenna 136, the demodulating unit 137, and the SPU 133, performs a session establishing process by performing mutual authentication with the IC card 13 so as to establish a communication session between the reader/writer 12 and the IC card 13, and then the process proceeds to step S42.

In step S42, the write control unit 172 requests write of data to the IC card 13. More specifically, the write control unit 172 generates a write command by setting a command code requesting write of data in the CMD field, storing a service area number of a service area of the write-once service where data is to be written and the data to be written in the service area in the data field, and storing a digital signature of the data to be written in the service field in the signature field. Then, the write control unit 172 transmits the generated write command to the IC card 13 through the communication control unit 171, the SPU 133, the modulating unit 134, and the antenna 136.

In the following description, data to be written in the service area of the storage unit 207 of the IC card 13 is also called "record data" when the data should be distinguished from other data.

The IC card 13 receives the write command transmitted from the reader/writer 12 in step S52 (described below), writes data in the specified service area based on the write command, and transmits a write end notification command to notify the reader/writer 12 that the data has been written in step S56.

In step S43, the write control unit 172 receives the write end notification command transmitted from the IC card 13 through the antenna 136, the demodulating unit 137, the SPU 133, and the communication control unit 171, so that the data write requesting process ends.

Next, a data writing process performed by the IC card 13 in accordance with the data write requesting process performed by the reader/writer 12 is described.

Figure 9:
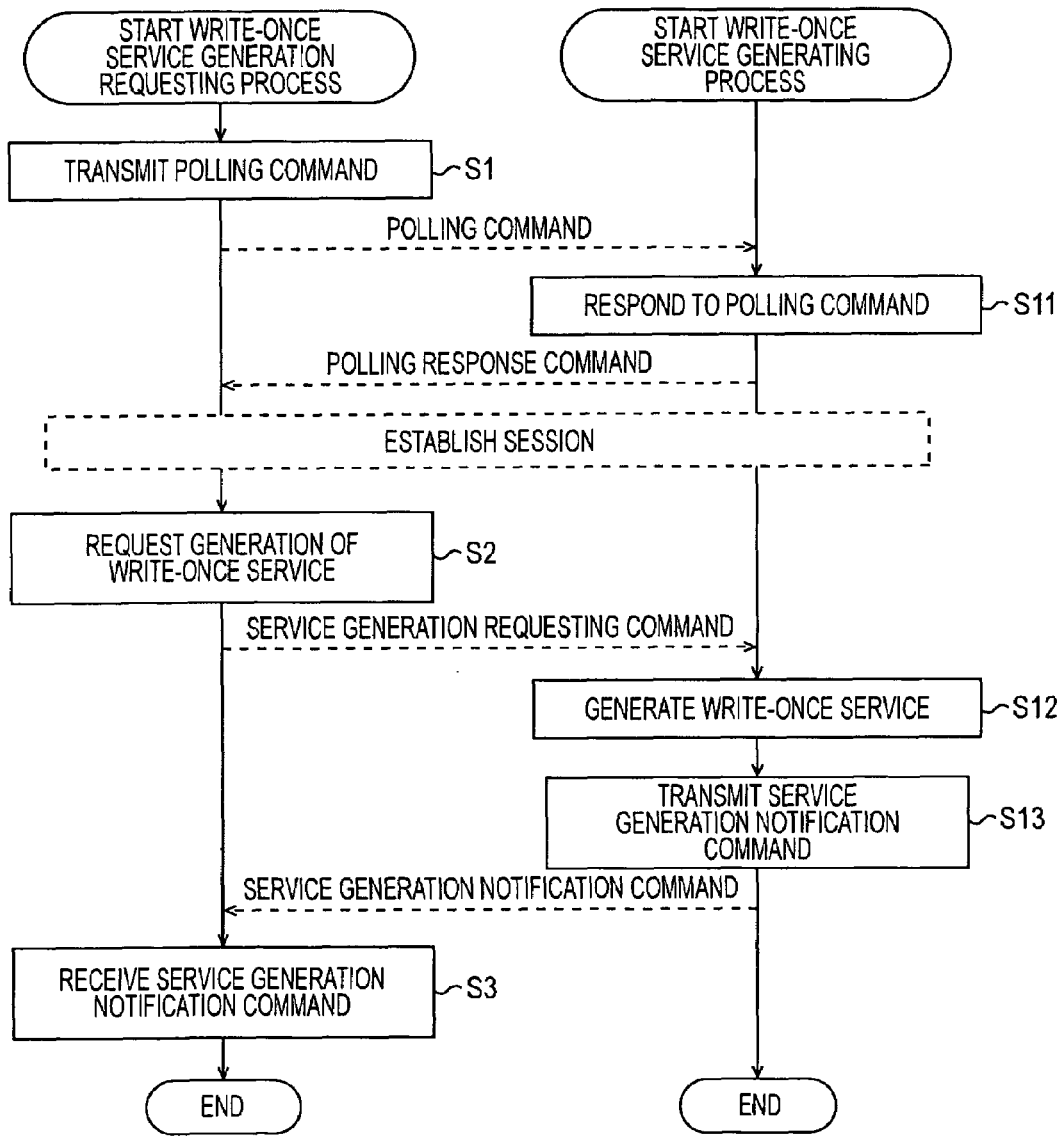
FIG. 9 is a flowchart illustrating a write-once service generating process performed in the IC card system shown in FIG. 1.

In step S51, the communication control unit 231 of the IC card 13 responds to the polling command, which was transmitted from the reader/writer 12 in the above-described step S41, as in the above-described step S11 shown in FIG. 9.

Then, a session establishing process is performed between the reader/writer 12 and the IC card 13. After a communication session between the reader/writer 12 and the IC card 13 has been established, the process proceeds to step S52.

In step S52, the write control unit 232 receives the write command, which was transmitted from the reader/writer 12 in the above-described step S42, through the antenna 201, the demodulating unit 202, the SPU 203, and the communication control unit 231.

In step S53, the write control unit 232 determines whether the write flag of the service area of the write-once service specified by the write command to write data is OFF. When it is determined that the write flag is OFF, that is, when the service area specified by the write command is in the state 301 or 303 shown in FIG. 10, the process proceeds to step S54.

In step S54, the write control unit 232 writes data in the storage unit 207. More specifically, the write control unit 232 writes record data stored in the data field of the write command and the signature of the record data stored in the signature field in the service area specified by the write command.

In step S55, the write control unit 232 turns ON the write flag of the service area in which the data has been written. Accordingly, the state of the service area in which the data has been written changes from the state 301 or 303 to a state 302 shown in FIG. 10. That is, the write flag is turned ON, writing data in the service area is prohibited, and a state where data is written in the service area is generated.

As described below with reference to FIG. 13, the write flag of the service area in which data has been written is kept in an ON-state and writing data in the service area is prohibited until the record data is read therefrom by the reader/writer 11. Therefore, tampering or erasing of the record data can be prevented.

When it is determined in step S53 that the write flag is in an ON-state, that is, when the service area specified by the write command is in the state 302 shown in FIG. 10 or when the record data written in the service area specified by the write command has not been read, steps S54 and S55 are skipped and the process proceeds to step S56 without the data being written in the service area. In other words, writing new data in the service area is prohibited until the record data stored in the service area is read for the first time.

In step S56, the write control unit 232 transmits a write end notification command, so that the data writing process ends. More specifically, the write control unit 232 generates a write end notification command by setting a command code indicating that the data has been written in the CMD field. At this time, if the data has been written in the service area based on the write command, the signature of the record data stored in the signature field of the write command is stored in the data field. On the other hand, if the data could not be written in the service area, data indicating the failure of writing data is stored in the data field. Then, the write control unit 232 transmits the generated write end notification command to the reader/writer 12 through the communication control unit 231, the SPU 203, the modulating unit 209, and the antenna 201.

Next, a process of checking data written in a service area of the write-once service performed between the reader/writer 12 and the IC card 13 is described with reference to the flowchart shown in FIG. 12.

First, a data check requesting process performed by the reader/writer 12 is described.

Figure 11:
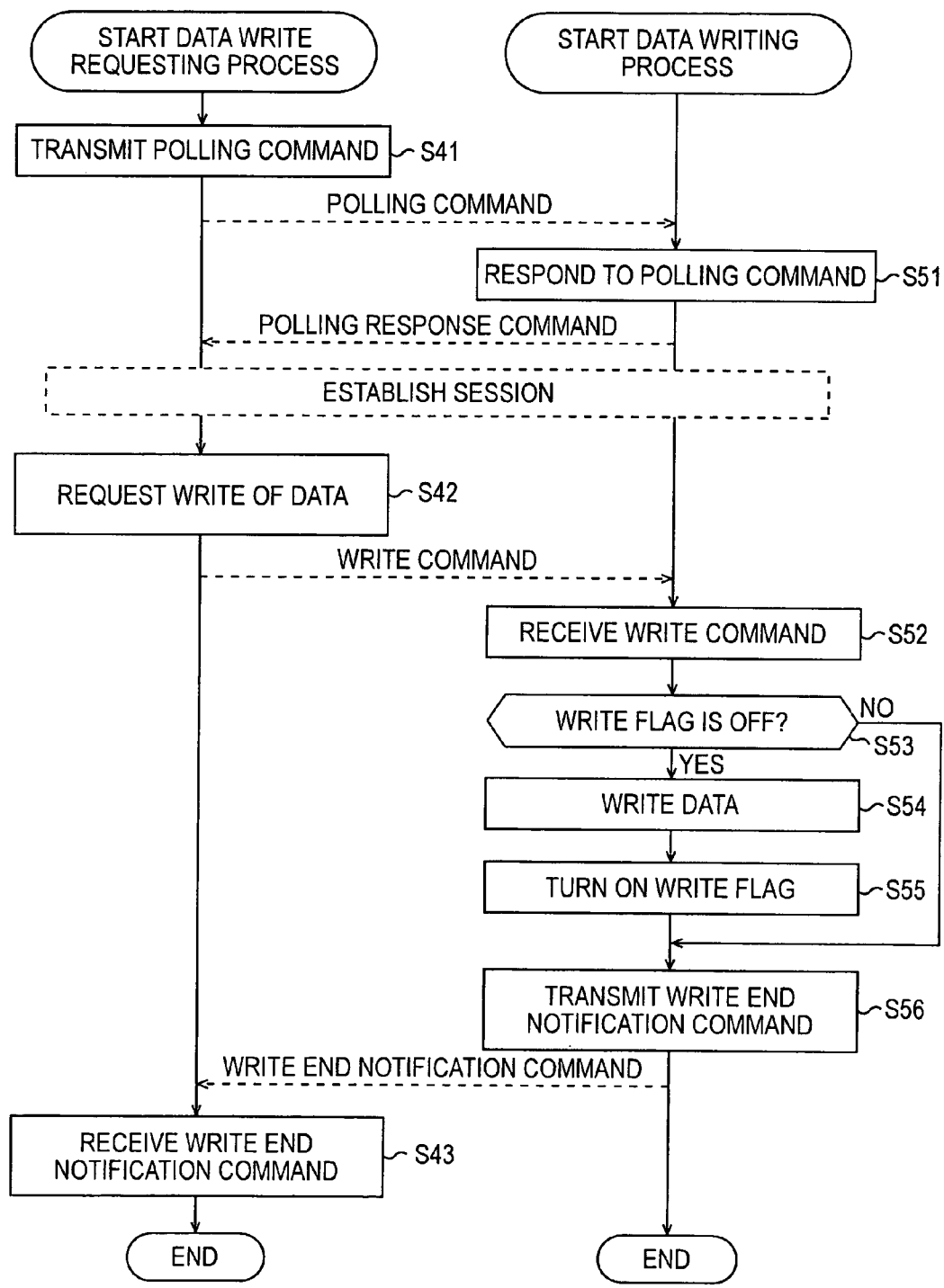
FIG. 11 is a flowchart illustrating a data writing process in the write-once service in the IC card system shown in FIG. 1.

In step S71, the communication control unit 171 of the reader/writer 12 transmits a polling command, as in the above-described step S42 shown in FIG. 11. When a polling response command for the polling command is transmitted from the IC card 13, a session establishing process is performed between the reader/writer 12 and the IC card 13. After a communication session between the reader/writer 12 and the IC card 13 has been established, the process proceeds to step S72.

In step S72, the write control unit 172 requests check of data written in a service area of the write-once service. More specifically, the write control unit 172 generates a data check command by setting a command code for requesting check of data in the CMD field and storing the service area number of the service area where the data to be checked is written in the data field. Then, the write control unit 172 transmits the generated data check command to the IC card 13 through the communication control unit 171, the SPU 133, the modulating unit 134, and the antenna 136. At this time, a read key need not be stored in the data field of the data check command (read key need not be transmitted).

The IC card 13 receives the data check command transmitted from the reader/writer 12 in step S82 (described below). When the write flag of the service area specified to check data is in an ON-state, that is, when the record data has not yet been read from the specified service area, the process proceeds to step S84 where the IC card 13 transmits a data check response command, which is a response to the data check command. At this time, a signature of the record data, which is written in the specified service area together with the record data, is stored in the data field of the data check response command.

In step S73, the write control unit 172 receives the data check response command transmitted from the IC card 13 through the antenna 136, the demodulating unit 137, the SPU 133, and the communication control unit 171, so that the data check requesting process ends.

Next, a data check responding process performed by the IC card 13 in accordance with the data check requesting process performed by the reader/writer 12 is described.

In step S81, the communication control unit 231 of the IC card 13 responds to the polling command, which was transmitted from the reader/writer 12 in the above-described step S71, as in the above-described step S11 shown in FIG. 9.

Then, a session establishing process is performed between the reader/writer 12 and the IC card 13. After a communication session between the reader/writer 12 and the IC card 13 has been established, the process proceeds to step S82.

In step S82, the read control unit 233 receives the data check command, which was transmitted from the reader/writer 12 in the above-described step S72, through the antenna 201, the demodulating unit 202, the SPU 203, and the communication control unit 231.

In step S83, the read control unit 233 determines whether the write flag of the service area of the write-once service specified by the data check command to check data is in an ON-state. When it is determined that the write flag is in an ON-state, that is, when data is written in the service area and the written data (record data) has not been read therefrom, the process proceeds to step S84.

In step S84, the read control unit 233 transmits a data check response command and then the data check responding process ends. More specifically, the read control unit 233 generates a data check response command by setting a command code indicating to respond to the data check command in the CMD field and storing a signature of the record data written in the specified service area in the data field. Then, the read control unit 233 transmits the generated data check response command to the reader/writer 12 through the communication control unit 231, the SPU 203, the modulating unit 209, and the antenna 201.

When it is determined in step S83 that the write flag is in an OFF-state, that is, when no data is written in the service data or when the written data (record data) has already been read, step S84 is skipped and the data check responding process ends without a data check response command being transmitted.

The reader/writer 12 receives the data check response command, recalculates the signature of the record data which has been requested to be written to the IC card 13, and compares the recalculated signature with the signature of the record data stored in the data field of the data check response command, so as to check the content of the record data written in the specified service area. When the recalculated signature matches the signature stored in the data check response command, it is determined that the record data has successfully been written and that the record data has not been read. On the other hand, when the recalculated signature does not match the signature stored in the data check response command, it is determined that the record data could not be written or that other record data has been written. When the data check response command is not transmitted, it is determined that the record data has been read from the specified service area or that the record data could not be written.

In this case, the record data written in the service area can be checked without transmitting a read key. Further, when a third party tries to check the record data written in the service area, only an irreversible signature of record data is returned and he/she cannot restore the record data. Accordingly, tapping of the record data by a third party can be prevented.

Then, the user who has requested write of data (owner of the reader/writer 11) obtains the IC card 13 from the user who has written data in the IC card 13 by using the reader/writer 12.

Next, a process of reading data from the write-once service performed between the reader/writer 11 and the IC card 13 is described with reference to the flowchart shown in FIG. 13.

First, a data read requesting process performed by the reader/writer 11 is described.

In step S101, the communication control unit 71 of the reader/writer 11 transmits a polling command, as in the above-described step S1 shown in FIG. 9. When a polling response command for the transmitted polling command is transmitted from the IC card 13, a session establishing process is performed between the reader/writer 11 and the IC card 13. After a communication session between the reader/writer 11 and the IC card 13 has been established, the process proceeds to step S102.

In step S102, the read control unit 73 requests reading data to the IC card 13. More specifically, the read control unit 73 generates a read command by setting a command code for requesting reading data in the CMD field and storing the service area number of the service area of the write-once service from which data is to be read and a read key for authentication to obtain a permission to read the data in the data field. Then, the read control unit 73 transmits the generated read command to the IC card 13 through the communication control unit 71, the SPU 33, the modulating unit 34, and the antenna 36.

The IC card 13 receives the read command transmitted from the reader/writer 11 in step S112 (described below). When the read key of the service area specified to read data matches the read key stored in the data field of the read command, the IC card 13 transmits a read response command storing data (record data) read from the specified service area in step S115.

In step S103, the read control unit 73 receives the read response command transmitted from the IC card 13 through the antenna 36, the demodulating unit 37, the SPU 33, and the communication control unit 71, so that the data read requesting process ends.

Next, a data reading process performed by the IC card 13 in accordance with the data read requesting process performed by the reader/writer 11 is described.

In step S111, the communication control unit 231 of the IC card 13 responds to the polling command, which was transmitted from the reader/writer 11 in the above-described step S101, as in the above-described step S11 shown in FIG. 9.

Then, a session establishing process is performed between the reader/writer 11 and the IC card 13. After a communication session between the reader/writer 11 and the IC card 13 has been established, the process proceeds to step S112.

In step S112, the read control unit 233 receives the read command, which was transmitted from the reader/writer 11 in the above-described step S102, through the antenna 201, the demodulating unit 202, the SPU 203, and the communication control unit 231.

In step S113, the read control unit 233 determines whether the read key of the service area specified by the read command matches the read key stored in the data field of the read command. When it is determined that both read keys match, the process proceeds to step S114.

In step S114, the read control unit 233 turns OFF the write flag of the service area specified by the read command to read data. Accordingly, the state of the service area changes to the state 303 when the current state is the state 302 shown in FIG. 10. When the current state is the state 303, the state does not change. That is, the write flag is turned OFF, data can be written in the service area, and data has been written in the service area.

In step S115, the read control unit 233 transmits a read response command and then the data reading process ends. More specifically, the read control unit 233 generates a read response command by setting a command code indicating to respond to the read command in the CMD field and storing the record data read from the service area specified by the read command in the data field. Then, the read control unit 233 transmits the generated read response command to the reader/writer 11 through the communication control unit 231, the SPU 203, the modulating unit 209, and the antenna 201.

When it is determined in step S113 that the read keys do not match, steps S114 and S115 are skipped and the data reading process ends without the read response command being transmitted to the reader/writer 11. Therefore, when the read keys do not match, reading the data from the service area is not permitted. On the other hand, when the read keys match, reading the data from the service area is permitted.

As described above, in the write-once service, a read key held by a user who has generated a write-once service need not be transmitted to another user, such as a user who writes data in the write-once service. Therefore, a risk that the read key falls into the hands of a third party can be reduced. Further, since data cannot be read without using the read key, tapping of written data can be prevented. After data has been written in a service area of the write-once service, writing data in the service area is prohibited until the written data is read therefrom, and thus tampering or erasing of the data can be prevented. Further, in the write-once service, two users who transmit/receive data need not have a common key and need not exchange a key, and thus a procedure of transmitting/receiving data is simplified. Still further, in the write-once service, different read keys or different service areas need not necessarily be used depending on users who write data, and thus the key and the service can be easily managed.

Figure 12:
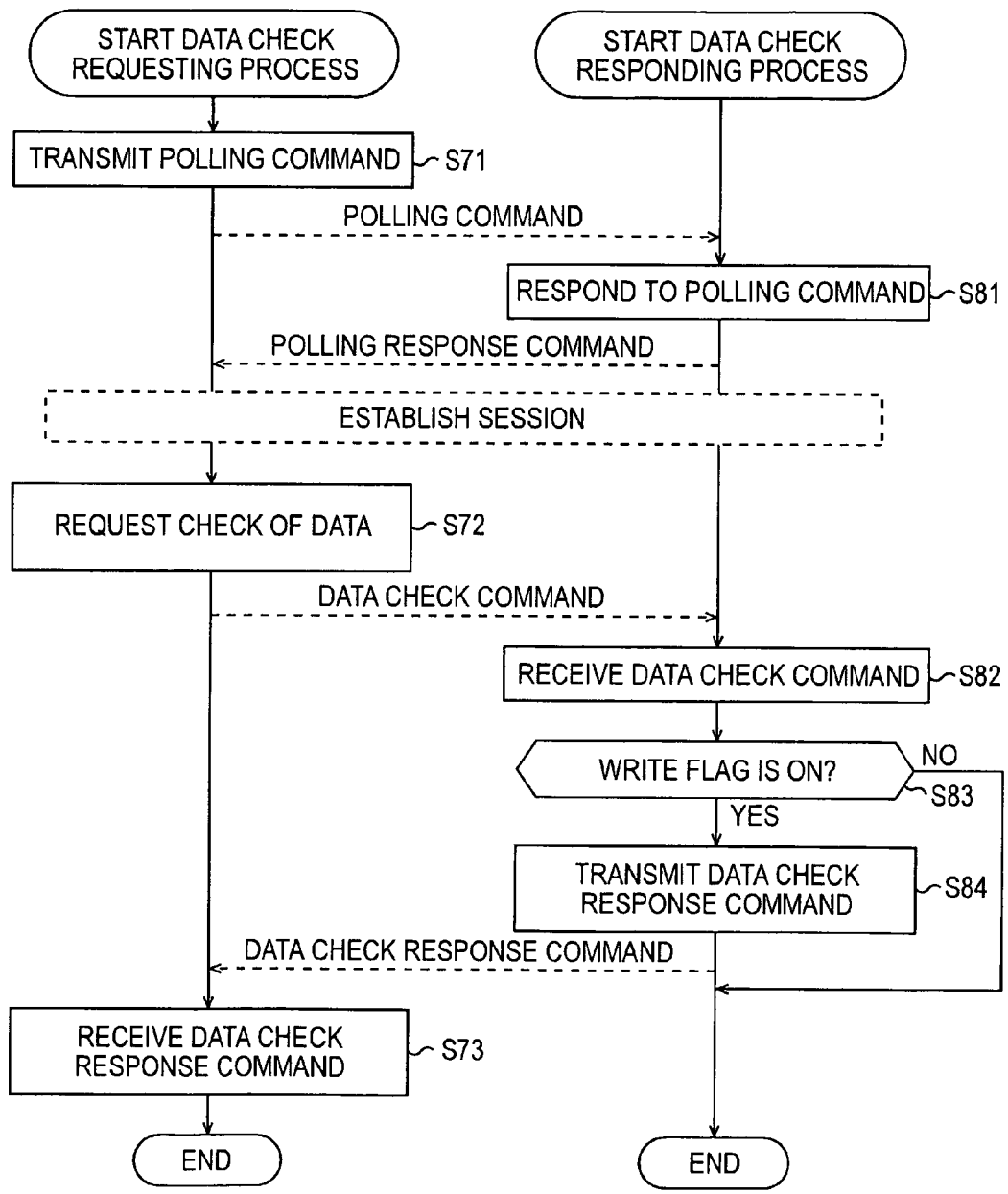
FIG. 12 is a flowchart illustrating a data checking process in the write-once service in the IC card system shown in FIG. 1.

Incidentally, the processes performed by the reader/writer 12 shown in FIGS. 11 and 12 can also be performed by the reader/writer 11. That is, the same reader/writer can generate a write-once service in the IC card 13, write data in the write-once service, and read data from the write-once service.

Alternatively, the data check command and the read command may not be distinguished from each other. For example, when a read key is stored in the data field of the read command, record data stored in the service area can be read. When a read key is not stored in the data field of the read command, only the signature of the record data stored in the service area can be read.

Next, a process in the IC card system 1 using a read-once service is described with reference to FIGS. 14 to 17.

Figure 14:
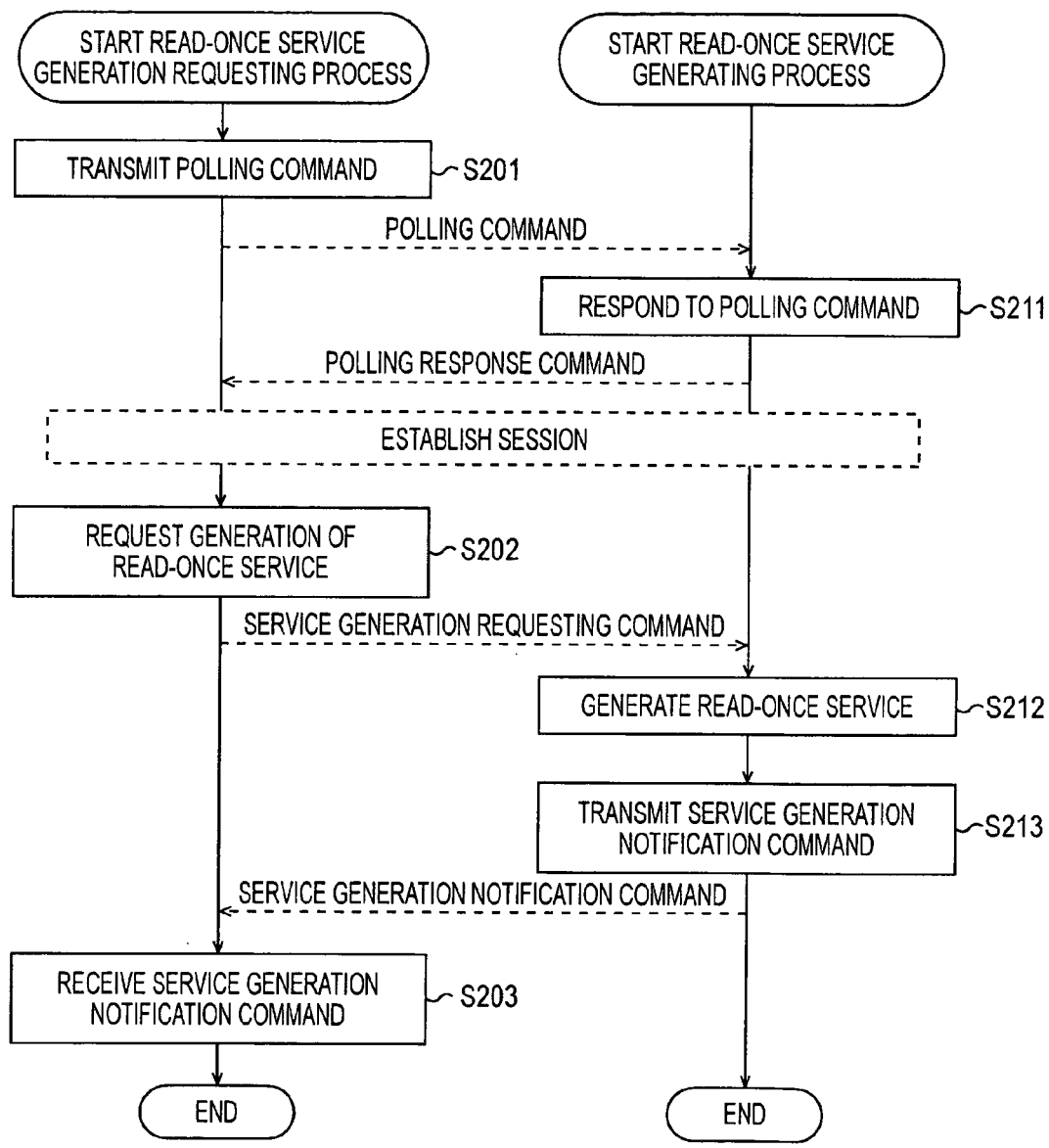
FIG. 14 is a flowchart illustrating a read-once service generating process performed in the IC card system shown in FIG. 1.

First, a read-once service generating process performed in the IC card system 1 is described with reference to the flowchart shown in FIG. 14.

A read-once service generation requesting process performed by the reader/writer 11 in the read-once service generating process is described.

In step S201, the communication control unit 71 of the reader/writer 11 transmits a polling command, as in the above-described step S1 shown in FIG. 9. When a polling response command for the transmitted polling command is transmitted from the IC card 13, a session establishing process is performed between the reader/writer 11 and the IC card 13. After a communication session between the reader/writer 11 and the IC card 13 has been established, the process proceeds to step S202.

In step S202, the service generation requesting unit 74 requests generation of a read-once service to the IC card 13. More specifically, the service generation requesting unit 74 generates a service generation requesting command by setting a command code for requesting generation of a read-once service in the CMD field and storing data required to generate a read-once service in the data field. The required data includes, for example, the number of service areas to be ensured in the read-once service, numbers assigned to the respective service areas, size of each service area, and write keys for authentication used to write data in the service areas. Then, the service generation requesting unit 74 transmits the generated service generation requesting command to the IC card 13 through the communication control unit 71, the SPU 33, the modulating unit 34, and the antenna 36.

The IC card 13 receives the service generation requesting command and generates a read-once service in step S212 (described below), and then transmits a service generation notification command, which is a response to the service generation requesting command, in step S213.

In step S203, the service generation requesting unit 74 receives the service generation notification command transmitted from the IC card 13 through the antenna 36, the demodulating unit 37, the SPU 33, and the communication control unit 71, so that the read-once service generation requesting process ends.

Next, a read-once service generating process performed by the IC card 13 in accordance with the read-once service generation requesting process performed by the reader/writer 11 is described.

In step S211, the communication control unit 231 of the IC card 13 responds to the polling command, which was transmitted from the reader/writer 11 in the above-described step S201, as in the above-described step S11 shown in FIG. 9.

Then, a session establishing process is performed between the reader/writer 11 and the IC card 13. After a communication session between the reader/writer 11 and the IC card 13 has been established, the process proceeds to step S212.

In step S212, the service generating unit 234 generates a read-once service. More specifically, the service generating unit 234 receives the service generation requesting command, which was transmitted from the reader/writer 11 in the above-described step S202, through the antenna 201, the demodulating unit 202, the SPU 203, and the communication control unit 231. Then, the service generating unit 234 ensures service areas whose number and size are specified by the service generation requesting command in the storage unit 207 and assigns service area numbers specified by the service generation requesting command to the respective service areas (stores the service area numbers in a predetermined position of the service areas).

Also, the service generating unit 234 registers write keys for permitting writing data in the respective service areas, the write keys being stored in the data field of the service generation requesting command (stores the write keys in a predetermined position of the service areas). Further, the service generating unit 234 ensures an area for storing an encryption flag indicating whether data stored in the service area can be encrypted in a predetermined position of each service area and sets an encryption flag value to OFF so that encryption of data is permitted.

Figure 15:
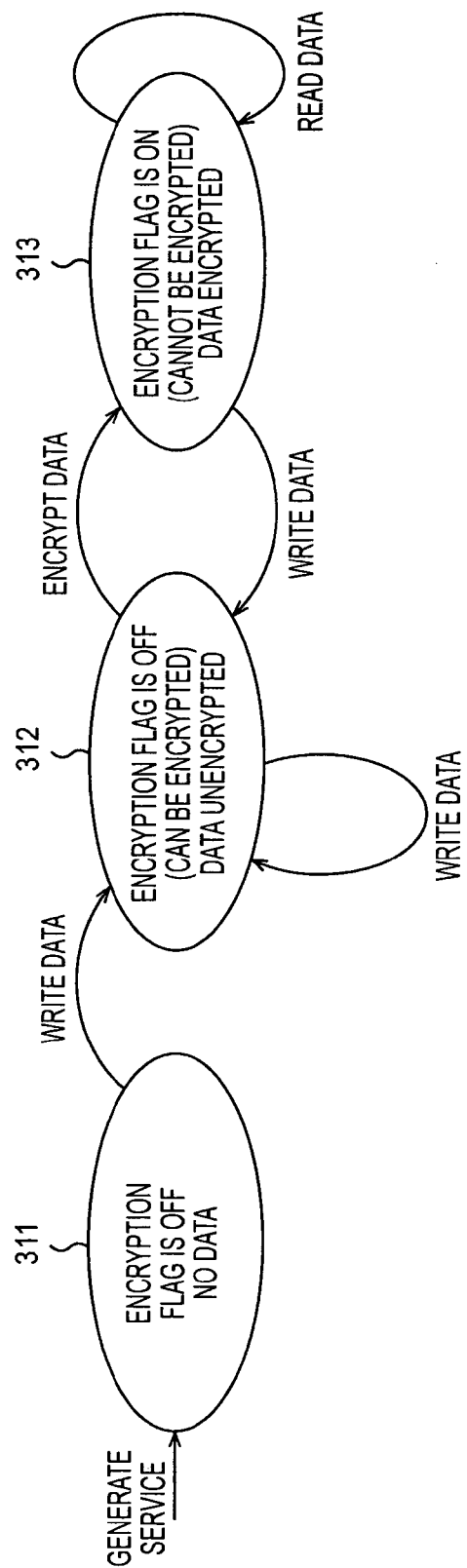
FIG. 15 illustrates transition of a state of a service area in a read-once service.

Accordingly, each service area of the read-once service is in a state 311 shown in FIG. 15. That is, an encryption flag is in an OFF-state and no data has been written in the service area.

Herein, different write keys may be registered in the respective service areas or the same write keys may be registered in the respective service areas. When different write keys are registered in the respective service areas, all of the write keys may be stored in the data field of the service generation requesting command or a plurality of write keys may be generated from one or more write keys by calculation. Alternatively, service areas of a read-once service may be registered (ensured) in the storage unit 207 by another process in advance and write keys may be registered in the registered service areas by the reader/writer 11.

In step S213, the service generating unit 234 transmits a service generation notification command to the reader/writer 11, and then the read-once service generating process ends.

More specifically, the service generating unit 234 generates a service generation notification command by setting a command code indicating that the service has been generated in the CMD field and storing data indicating a generation result of the read-once service (e.g., whether the service has been successfully generated) in the data field. Then, the service generating unit 234 transmits the generated service generation notification command to the reader/writer 11 through the communication control unit 231, the SPU 203, the modulating unit 209, and the antenna 201.

Next, a process of writing data in the read-once service performed between the reader/writer 11 and the IC card 13 is described with reference to the flowchart shown in FIG. 16.

First, a data write requesting process performed by the reader/writer 11 is described.

In step S241, the communication control unit 71 of the reader/writer 11 transmits a polling command, as in the above-described step S1 shown in FIG. 9. When a polling response command for the transmitted polling command is transmitted from the IC card 13, a session establishing process is performed between the reader/writer 11 and the IC card 13. After a communication session between the reader/writer 11 and the IC card 13 has been established, the process proceeds to step S242.

In step S242, the write control unit 72 requests write of data to the IC card 13. More specifically, the write control unit 72 generates a write command by setting a command code requesting write of data in the CMD field, storing the service area number of the service area of the read-once service where data is to be written, record data to be written in the service area, and a write key for authentication to obtain permission of writing data in the data field, and storing the signature of the record data in the signature field. Then, the write control unit 72 transmits the generated write command to the IC card 13 through the communication control unit 71, the SPU 33, the modulating unit 34, and the antenna 36.

The IC card 13 receives the write command transmitted from the reader/writer 11 in step S252 (described below). When the write key of the service area specified to write data matches the write key stored in the data field of the write command, the data is written in the specified service area. Then, in step S256, the IC card 13 transmits a write end notification command indicating that the data has been written.

In step S243, the write control unit 72 receives the write end notification command transmitted from the IC card 13 through the antenna 36, the demodulating unit 37, the SPU 33, and the communication control unit 71, and then the data write requesting process ends.

Next, a data writing process performed by the IC card 13 in accordance with the data write requesting process performed by the reader/writer 11 is described.

In step S251, the communication control unit 231 of the IC card 13 responds to the polling command, which was transmitted from the reader/writer 11 in the above-described step S241, as in the above-described step S11 shown in FIG. 9.

Then, a session establishing process is performed between the reader/writer 11 and the IC card 13. After a communication session between the reader/writer 11 and the IC card 13 has been established, the process proceeds to step S252.

In step S252, the write control unit 232 receives the write command, which was transmitted from the reader/writer 11 in the above-described step S242, through the antenna 201, the demodulating unit 202, the SPU 203, and the communication control unit 231.

In step S253, the write control unit 232 determines whether the write key of the service area specified by the write command to write data matches the write key stored in the data field of the write command. When it is determined that the both write keys match, the process proceeds to step S254.

In step S254, the write control unit 232 writes data in the storage unit 207. More specifically, the write control unit 232 writes the record data stored in the data field of the write command and the signature of the record data stored in the signature field in the service area specified by the write command.

In step S255, the write control unit 232 turns OFF the encryption flag of the service area specified by the write command. Accordingly, the state of the service area changes to a state 312 when the current state is the state 311 or 313 shown in FIG. 15. When the current state is the state 312, the state does not change. That is, in the state 312, the record data stored in the service area is not encrypted, the encryption flag is in an OFF-state, and the record data can be encrypted.

In step S256, the write control unit 232 transmits a write end notification command, and then the data writing process ends. More specifically, the write control unit 232 generates a write end notification command by setting a command code indicating that the data has been written in the CMD field. At this time, if the data has been written in the service area based on the write command, the signature of the record data stored in the signature field of the write command is stored in the data field. On the other hand, if the data could not be written in the service area, data indicating the failure of writing data is stored in the data field. Then, the write control unit 232 transmits the generated write end notification command to the reader/writer 11 through the communication control unit 231, the SPU 203, the modulating unit 209, and the antenna 201.

When it is determined in step S253 that the write keys do not match, steps S254 to S256 are skipped, and the data writing process ends without the data being written in the service area. That is, writing data in the service area is not permitted when the both write keys do not match, whereas writing data in the service area is permitted when the both write keys match.

Then, the user who has written data in the IC card 13 by using the reader/writer 11 transmits the IC card 13 to the owner of the reader/writer 12.

Next, a process of reading data from the read-once service performed between the reader/writer 12 and the IC card 13 is described with reference to the flowchart shown in FIG. 17.

First, a data read requesting process performed by the reader/writer 12 is described.

In step S271, the communication control unit 171 of the reader/writer 12 transmits a polling command as in the above-described step S41 shown in FIG. 11. When a polling response command for the transmitted polling command is transmitted from the IC card 13, a session establishing process is performed between the reader/writer 12 and the IC card 13. After a communication session between the reader/writer 12 and the IC card 13 has been established, the process proceeds to step S272.

In step S272, the read control unit 173 requests read of data to the IC card 13. More specifically, the read control unit 173 generates a read command by setting a command code requesting read of data in the CMD field and storing the service area number of the service area of the read-once service from which data is to be read and an encryption key for encrypting the data to be read in the data field. The encryption key stored in the data field may be independently set by the reader/writer 12 (read control unit 173) as long as the encryption key is based on an encrypting method compatible with the read-once service (e.g., data encryption standard (DES)). Then, the read control unit 173 transmits the generated read command to the IC card 13 through the communication control unit 171, the SPU 133, the modulating unit 134, and the antenna 136.

The IC card 13 receives the read command transmitted from the reader/writer 12 in step S282 (described below). When the encryption flag of the service area specified by the read command is OFF, that is, when the record data stored in the specified service area is not encrypted, the IC card 13 encrypts the record data by using the encryption key stored in the read command. Then, the IC card 13 transmits a read response command storing the encrypted record data in step S286 (described below). On the other hand, when the encryption flag of the service area specified by the read command is ON, that is, when the record data stored in the specified service area is encrypted, the IC card 13 reads the record data from the specified service area and transmits a read response command storing the read record data in step S286 (described below).

In step S273, the read control unit 173 determines whether it has received a read response command. When it is determined that a read response command is not received in a predetermined time period after the read command is transmitted, e.g., when failure occurs in transmission of the read command or reception of a read response command because of a long distance between the reader/writer 12 and the IC card 13, the process proceeds to step S274.

In step S274, the read control unit 173 determines whether to request retransmission of the read response command. When it is determined that retransmission of the read response command should be requested, the process returns to step S272 and steps S272 to S274 are repeated until it is determined in step S273 that the read response command has been received or it is determined in step S274 that retransmission of the read response command should not be requested. In this process, a read command is repeatedly transmitted from the reader/writer 12 to the IC card 13.

When it is determined in step S273 that a read response command was transmitted from the IC card 13 in a predetermined time period after the read command was transmitted and that the read response command has been received by the read control unit 173 through the antenna 136, the demodulating unit 137, the SPU 133, and the communication control unit 171, the process proceeds to step S275.

In step S275, the decrypting unit 175 decrypts the data read from the IC card 13, and then the data read requesting process ends. More specifically, the read control unit 173 supplies the record data stored in the data field of the read command and an encryption key transmitted to the IC card 13 by storing it in the read command to the decrypting unit 175. The decrypting unit 175 decrypts the record data by using the supplied encryption key to read decrypted record data and supplies the decrypted record data to the read control unit 173.

When it is determined in step S274 that retransmission of the read response command should not be requested, for example, when the read response command could not be received from the IC card 13 even after transmitting a read command a predetermined number of times, the data read requesting process ends.

Next, a data reading process performed by the IC card 13 in accordance with the data read requesting process performed by the reader/writer 12 is described.

In step S281, the communication control unit 231 of the IC card 13 responds to the polling command, which was transmitted from the reader/writer 12 in the above-described step S271, as in the above-described step S11 shown in FIG. 9.

Then, a session establishing process is performed between the reader/writer 12 and the IC card 13. After a communication session between the reader/writer 12 and the IC card 13 has been established, the process proceeds to step S282.

In step S282, the read control unit 233 receives the read command, which was transmitted from the reader/writer 12 in the above-described step S272, through the antenna 201, the demodulating unit 202, the SPU 203, and the communication control unit 231.

In step S283, the read control unit 233 determines whether the encryption flag of the service area specified by the read command to read data is OFF. When it is determined that the encryption flag is OFF, that is, when the service area specified by the read command is in the state 312 shown, in FIG. 15 or when the record data recorded in the specified service area is not encrypted, the process proceeds to step S284.

In step S284, the encrypting unit 235 encrypts the data. More specifically, the read control unit 233 reads the record data in the service area specified by the read command and supplies the read record data and the read command to the encrypting unit 235. The encrypting unit 235 encrypts the record data in a predetermined encrypting method by using the encryption key stored in the data field of the read command. Then, the encrypting unit 235 supplies the encrypted record data to the read control unit 233 and overwrites the service area from which the record data was read.

In step S285, the encrypting unit 235 turns ON the encryption flag of the service area in which the encrypted recorded data has been written. Accordingly, the service area changes from the state 312 to the state 313 shown in FIG. 15. That is, in the state 313, the record data stored in the service area is encrypted, the encryption flag is ON, and encryption of the record data is prohibited.

When it is determined in step S283 that the encryption flag is ON, that is, when the service area specified by the read command is in the state 313 shown in FIG. 15 or when the record data in the service area specified by the read command has already been encrypted by an encryption key stored in a previously received read command based on the read command received from the reader/writer 12 or another reader/writer, steps S284 and S285 are skipped and the process proceeds to step S286. In other words, the record data in the service area specified by the read command is not encrypted.

Therefore, when record data stored in a service area is read for the first time, the record data is encrypted by using an encryption key stored in a read command for requesting read of the record data. When the record data stored in the service area is read for the second time or thereafter, the record data is not further encrypted. That is, the record data is encrypted only once.

As described above, when record data is newly written in a service area by a write command, the encryption flag of the service area is turned OFF, the service area changes from the state 313 to the state 312, and encryption of the record data is permitted.

In step S286, the read control unit 233 transmits a read response command, and then the data reading process ends. More specifically, the read control unit 233 generates a read response command by setting a command code indicating to respond to the read command in the CMD field and by storing the record data of the service area specified by the read command in the data field. Then, the read control unit 233 transmits the generated read response command to the reader/writer 12 through the communication control unit 231, the SPU 203, the modulating unit 209, and the antenna 201.

When it is determined in step S283 that the encryption flag is OFF, the data encrypted by using the encryption key stored in the read command received at this time is stored in the data field. On the other hand, when it is determined in step S283 that the encryption flag is ON, the record data recorded in the specified service area, that is, the data encrypted by the encryption key stored in the read command received previously is stored in the data field. In other words, when the record data stored in the service area is read for the first time, the record data encrypted in step S284 is transmitted to the reader/writer 12. When the record data stored in the service area is read for the second time or thereafter, the record data that is already encrypted in step S284 during a previous data reading process by the IC card 13 is read from the service area, and the read record data is transmitted to the reader/writer 12.

When an effective encryption key is not stored in the data field of a read command, the IC card 13 does not perform a process on the read command. When reading data from a service area in which no data is written (service area of the state 311 shown in FIG. 15) is requested, data indicating that no data is written is stored in the data field of a read response command transmitted in step S286.

As described above, in the read-once service, a write key held by a user who generated a read-once service need not be transmitted to another user, e.g., a user who reads data from the read-once service. Therefore, a risk that the write key falls into the hands of a third party is reduced. Further, since data cannot be written without using the write key, tampering of record data or write of record data by a third party (spoofing) can be prevented. Further, in the read-once service, two users who transmit/receive data need not have a common key and also need not exchange keys, and thus a procedure of transmitting/receiving data is simplified. Still further, in the read-once service, different write keys or different service areas need not necessarily be used depending on users who read data, and thus the key and the service can be easily managed.

When record data is read from the read-once service, since the record data is encrypted by an encryption key independently set by a reader/writer that reads the record data first, only a user (reader/writer) who reads the record data first can check the content of the record data. Therefore, after an authorized user (a user who is requested to read data from a user who wrote the data in the read-once service) has once read the record data from the read-once service, a third party cannot tap the content of the record data thereafter. For example, even if the user loses the IC card 13 or throws it away, the content of the record data is not tapped by a third party. If the record data is read by a third party from the read-once service before the authorized user reads the record data, the record data is encrypted by a key unique to the third party. Thus, the authorized user can easily know that the record data has been tapped by someone and immediately take appropriate measures, for example, stop using the record data.

The process performed by the reader/writer 12 described above with reference to FIG. 17 can be performed by the reader/writer 11. That is, a user can generate a read-once service in the IC card 13, write data in the read-once service, and read data from the read-once service by using the same reader/writer.

As described above, a first read key that is transmitted from a first information processing apparatus and that permits reading data from the storage area is registered, writing data in the storage unit is controlled so that writing new data in the storage area is prohibited until data stored in the storage area is read for the first time, and reading data from the storage unit is controlled so that reading data from the storage area is permitted if a second read key that is transmitted from the first information processing apparatus or a second information processing apparatus matches the first read key when reading data from the storage area is requested by the first information processing apparatus or the second information processing apparatus. Accordingly, data can be transmitted/received more easily and safely.

Furthermore, a first write key that is transmitted from a first information processing apparatus and that permits writing data in the storage area is registered, writing data in the storage unit is controlled so that writing data in the storage area is permitted if a second write key that is transmitted from the first information processing apparatus or a second information processing apparatus matches the first write key when writing data in the storage area is requested by the first information processing apparatus or the second information processing apparatus, data stored in the storage area is encrypted by using an encryption key that is transmitted from the first information processing apparatus or the second information processing apparatus when the data stored in the storage area is read for the first time in response to a request for reading the data from the storage area from the first information processing apparatus or the second information processing apparatus, the encrypted data is transmitted to the first information processing apparatus or the second information processing apparatus when the data stored in the storage area is read for the first time in response to a request for reading the data from the storage area from the first information processing apparatus or the second information processing apparatus, and the encrypted data is read from the storage area and the read data is transmitted to the first information processing apparatus or the second information processing apparatus when the data stored in the storage area is read for the second time or thereafter. Accordingly, data can be transmitted/received more easily and safely.

In the above description, an IC card system using a noncontact IC card is used as an example. However, the present invention can also be applied to a data transmission/reception system using a contact IC card or a storage device other than an IC card including a computer or hardware capable of executing the above-described series of processes.

The above-described series of processes can be executed by either hardware or software. When the series of processes are executed by software, a program constituting the software is installed through a network or a recording medium into a computer incorporated in dedicated hardware or a general-purpose personal computer capable of executing various functions by installing various programs thereto.

The recording medium includes a package medium that is distributed to provide a user with a program and that contains a program, such as a magnetic disk (including a flexible disk) 51 or 151, an optical disc (including a compact disc read only memory (CD-ROM) and a digital versatile disc (DVD)) 52 or 152, a magneto-optical disc (including a Mini Disc® (MD)) 53 or 153, or a semiconductor memory 54 or 154 shown in FIGS. 3 and 5. Also, the recording medium includes the ROM 205 (FIG. 7) containing a program, a hard disk included in the recording unit 32 or 132, or the storage unit 207 (FIG. 7) that is provided to a user while being incorporated in a computer.

The program for executing the above-described series of processes can be installed into a computer through a wired or wireless communication medium, such as a local area network, the Internet, or digital satellite broadcast, and if necessary, through an interface, such as a router or a modem.

In this specification, the steps describing the program stored in the recording medium may be performed in time series in accordance with the described order or may be performed in parallel or individually.

In this specification, the term "system" means an entire configuration including a plurality of apparatuses or units.

It should be understood by those skilled in the art that various modifications, combinations, sub-combinations and alterations may occur depending on design requirements and other factors insofar as they are within the scope of the appended claims or the equivalents thereof.

What is claimed is:

1. A data storage apparatus including a storage unit having a storage area, the data storage apparatus comprising:
    read key registration means for registering a first read key that is transmitted from a first information processing apparatus and that permits reading data from the storage area;
    write control means for controlling writing data in the storage unit so that writing new data in the storage area is prohibited until data stored in the storage area is read for the first time; and
    read control means for controlling reading data from the storage unit so that reading data from the storage area is permitted if a second read key that is transmitted from the first information processing apparatus or a second information processing apparatus matches the first read key when reading data from the storage area is requested by the first information processing apparatus or the second information processing apparatus,
    wherein the write control means controls writing data in the storage unit so as to further write a digital signature in the storage area, the digital signature being generated by encrypting data to be written in the storage area and being transmitted together with the data to be written in the storage area, and
    wherein, when checking the data stored in the storage area is requested without the second key being transmitted from the first information processing apparatus or the second information processing apparatus, the read control means controls reading data from the storage unit so as to read the digital signature from the storage area and to transmit the digital signature to the first information processing apparatus or the second information processing apparatus.

2. A data storage apparatus including a storage unit having a storage area, the data storage apparatus comprising:
    write key registration means for registering a first write key that is transmitted from a first information processing apparatus and that permits writing data in the storage area;
    write control means for controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus;
    encrypting means for encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and
    transmission control means for transmitting the data encrypted by the encrypting means to the first information processing apparatus or the second information processing apparatus when the data stored in the storage area is read for the first time in response to a request for reading the data from the storage area from the first information processing apparatus or the second information processing apparatus and for reading the data encrypted by the encrypting means from the storage area and transmitting the read data to the first information processing apparatus or the second information processing apparatus when the data stored in the storage area is read for the second time or thereafter.

3. The data storage apparatus according to claim 2,
    wherein the write control means controls writing data in the storage unit so as to further write a digital signature in the storage area, the digital signature being generated by encrypting data to be written in the storage area and being transmitted together with the data to be written in the storage area, and
    wherein, when checking the data stored in the storage area is requested without the second key being transmitted from the first information processing apparatus or the second information processing apparatus, the read control means controls reading data from the storage unit so as to read the digital signature from the storage area and to transmit the digital signature to the first information processing apparatus or the second information processing apparatus.

4. A data processing method for a data storage apparatus including a storage unit having a storage area, the data processing method comprising the steps of:
    registering a first write key that is transmitted from a first information processing apparatus and that permits writing data in the storage area;
    controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus;
    encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter.

5. A recording medium recording a computer-readable program for data processing performed in a data storage apparatus including a storage unit having a storage area, the program comprising the steps of:

registering a first write key that is transmitted from a first information processing apparatus and that permits writing data in the storage area;

controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus;

encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter.

6. A program allowing a data storage apparatus including a storage unit having a storage area to execute data processing, the program comprising the steps of:

registering a first write key that is transmitted from a first information processing apparatus and that permits writing data in the storage area;

controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus;

encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and transmitting the data encrypted in the encrypting step to the first information processing apparatus or the second information processing apparatus when the data stored in the storage area is read for the first time in response to a request for reading the data from the storage area from the first information processing apparatus or the second information processing apparatus and reading the data encrypted in the encrypting step from the storage area and transmitting the read data to the first information processing apparatus or the second information processing apparatus when the data stored in the storage area is read for the second time or thereafter.

7. A data storage apparatus including a storage unit having a storage area, the data storage apparatus comprising:

a write key registration unit registering a first write key that is transmitted from a first information processing apparatus and that permits writing data in the storage area;

a write control unit controlling writing data in the storage unit so that writing data in the storage area is permitted if a second write key that is transmitted from the first information processing apparatus or a second information processing apparatus matches the first write key when writing data in the storage area is requested by the first information processing apparatus or the second information processing apparatus;

an encrypting unit encrypting data stored in the storage area by using an encryption key that is transmitted from the first information processing apparatus or the second information processing apparatus when the data stored in the storage area is read for the first time in response to a request for reading the data from the storage area from the first information processing apparatus or the second information processing apparatus; and a transmission control unit transmitting the data encrypted by the encrypting unit to the first information processing apparatus or the second information processing apparatus when the data stored in the storage area is read for the first time in response to a request for reading the data from the storage area from the first information processing apparatus or the second information processing apparatus and reading the data encrypted by the encrypting unit from the storage area and transmitting the read data to the first information processing apparatus or the second information processing apparatus when the data stored in the storage area is read for the second time or thereafter.

* * * * *